(12) United States Patent
Moore et al.

(10) Patent No.: US 10,239,978 B2
(45) Date of Patent: *Mar. 26, 2019

(54) REDOX ACTIVE COLLOIDAL PARTICLES FOR FLOW BATTERIES

(71) Applicant: The Board of Trustees of the University of Illinois, Urbana, IL (US)

(72) Inventors: Jeffrey S. Moore, Savoy, IL (US); Joaquin Rodriguez-Lopez, Urbana, IL (US); Nagarjuna Gavvalapalli, Urbana, IL (US); Elena Montoto, Champaign, IL (US); Jingshu Hui, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/410,499

(22) Filed: Jan. 19, 2017

(65) Prior Publication Data

US 2017/0133689 A1    May 11, 2017

Related U.S. Application Data

(63) Continuation-in-part of application No. 15/000,910, filed on Jan. 19, 2016, now Pat. No. 9,982,068.

(60) Provisional application No. 62/104,329, filed on Jan. 16, 2015.

(51) Int. Cl.
| | |
|---|---|
| *H01M 8/18* | (2006.01) |
| *C08F 12/26* | (2006.01) |
| *C08F 12/32* | (2006.01) |
| *C08F 112/14* | (2006.01) |
| *C08F 212/14* | (2006.01) |
| *C08F 214/14* | (2006.01) |
| *C08F 8/30* | (2006.01) |
| *H01M 8/20* | (2006.01) |
| *H01M 8/02* | (2016.01) |

(52) U.S. Cl.
CPC ............. *C08F 214/14* (2013.01); *C08F 8/30* (2013.01); *C08F 12/26* (2013.01); *C08F 12/32* (2013.01); *C08F 112/14* (2013.01); *C08F 212/14* (2013.01); *H01M 8/02* (2013.01); *H01M 8/188* (2013.01); *H01M 8/20* (2013.01); *H01M 2300/0025* (2013.01); *H01M 2300/0028* (2013.01)

(58) Field of Classification Search
CPC ........ C08F 214/14; C08F 8/30; C08F 112/14; C08F 212/14; H01M 8/02; H01M 8/188; H01M 8/20; H01M 8/30; H01M 2300/0025; H01M 2300/0028
See application file for complete search history.

(56) References Cited

U.S. PATENT DOCUMENTS

| 9,123,923 B2 | 9/2015 | Zhang et al. |
| 2011/0104574 A1 | 5/2011 | Shembel et al. |
| 2013/0224538 A1 | 8/2013 | Jansen et al. |
| 2014/0099569 A1 | 4/2014 | Oh et al. |
| 2015/0207165 A1 | 7/2015 | Schubert et al. |
| 2015/0228950 A1 | 8/2015 | Moon et al. |
| 2015/0335783 A1 | 11/2015 | Kohn et al. |
| 2015/0372333 A1 | 12/2015 | Odom et al. |

FOREIGN PATENT DOCUMENTS

| JP | S61155411 A | 7/1986 |
| WO | 2014026728 A1 | 2/2014 |

OTHER PUBLICATIONS

Brushett et al., "An All-Organic Non-aqueous Lithium-Ion Redox Flow Battery", Advanced Energy Materials (May 15, 2012) 2: 1390-1396.
Burgess, M. et al., "Scanning Electrochemical Microscopy and Hydrodynamic Voltammetry Investigation of Charge Transfer Mechanisms on Redox Active Polymers," Journal of the Electrochemical Society, 163 (4) H3006-H3013 (2016).
Darling et al., "Pathways to low cost electrochemical energy storage: a comparison of aqueous and nonaqueous flow batteries", Energy and Environmental Science, The Royal Society of Chemistry (Sep. 16, 2014) 7: 3459-3477.
Gong, K. et al., "Nonaqueous Redox-Flow Batteries: Organic Solvents, Supporting Electrolytes, and Redox Pairs," Energy & Environmental Science, The Royal Society of Chemistry 2012, 00, 1-25.
Janoschka, T. et al., "An Aqueous, Polymer-Based Redox-Flow Battery Using Non-Corrosive, Safe, and Low-Cost Materials," Nature, vol. 527, Nov. 5, 2015, 78-91.
Nagarjuna et al., "Impact of Redox-Active Polymer Molecular Weight on the Electrochemical Properties and Transport Across Porous Separators in Nonaqueous Solvents", Journal of the American Chemical Society (Oct. 17, 2014) 136: 16309-16316.

(Continued)

*Primary Examiner* — Anca Eoff

(74) *Attorney, Agent, or Firm* — Haukaas Fortius PLLC; Michael H. Haukaas

(57) ABSTRACT

The invention provides a redox flow battery comprising a microporous or nanoporous size-exclusion membrane, wherein one cell of the battery contains a redox-active colloidal particle dispersed in a non-aqueous solvent. The redox flow battery provides enhanced ionic conductivity across the electrolyte separator and reduced redox-active species crossover, thereby improving the performance and enabling widespread utilization of the battery. Redox active colloidal particles (RACs) were prepared, analyzed, and were found to be highly effective redox species for use in redox flow batteries.

13 Claims, 27 Drawing Sheets

(56) References Cited

OTHER PUBLICATIONS

Oh, S.H. et al., "A Metal-Free and All-Organic Redox Flow Battery with Polythiophene as the Electroactive Species," Journal of Materials Chemistry A, 2014, 2, 19994-19998.
Shin, S-H et al., "A Review of Current Developments in Non-Aqueous Redox Flow Batteries: Characterization of Their Membranes for Design Perspective," RSC Advances, 2013, 3 9095-9116.
Wang et al., "Li-Redox Flow Batteries Based on Hybrid Electrolytes: At the Cross Road between Li-ion and Redox Flow Batteries", Advanced Energy Materials (Jun. 4, 2012) 2: 770-779.
Wei, X. et al., "Nanoporous Polytetrafluoroethylene/Silica Composite Separator as a High-Performance All-Vanadium Redox Flow Battery Membrane," Advanced Energy Materials, 2013, 3, 1215-1220.
Wei, X. et al., "Polyvinyl Chloride/Silica Nanoporous Composite Separator for All-Vanadium Redox Flow Battery Applications," Journal of the Electrochemical Society, 160 (8) A1215-A1218 (2013).
Winsberg, J. et al., "Polymer/Zinc Hybrid-Flow Battery Using Block Copolymer Micelles Featureing TEMPO Corona as Catholyte," Polymer Chemistry, 2013, 00, 1-9.
Zhang, H. et al., "Nanofiltration (NF) Membranes: The Next Generation Separators for all Vanadium Redox Flow Batteries (VRBs)?," Energy Environ. Sci., 2011, 4, 1676-1679.

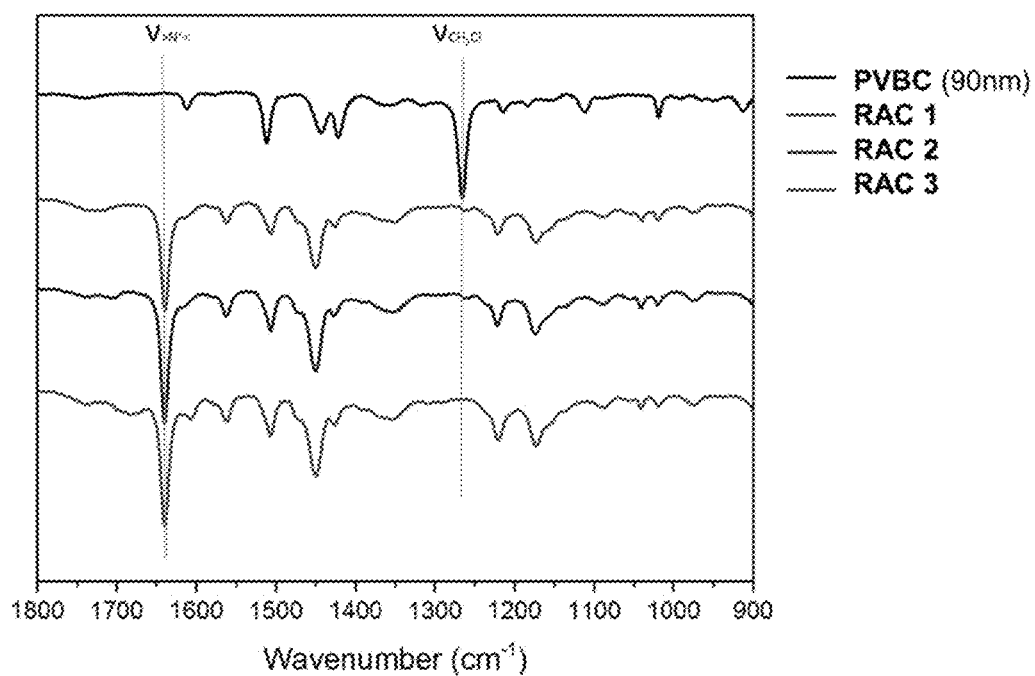
*Fig. 6*
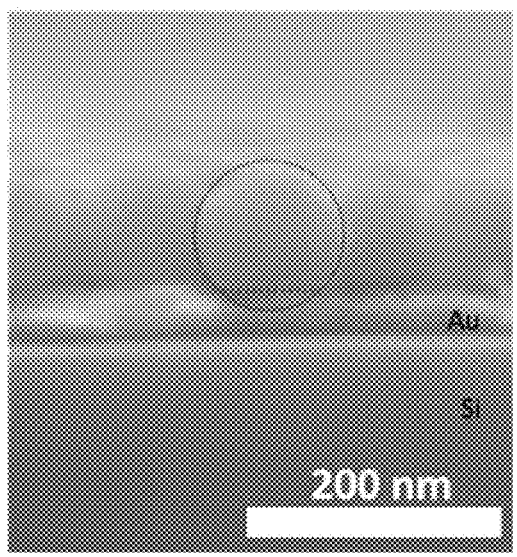 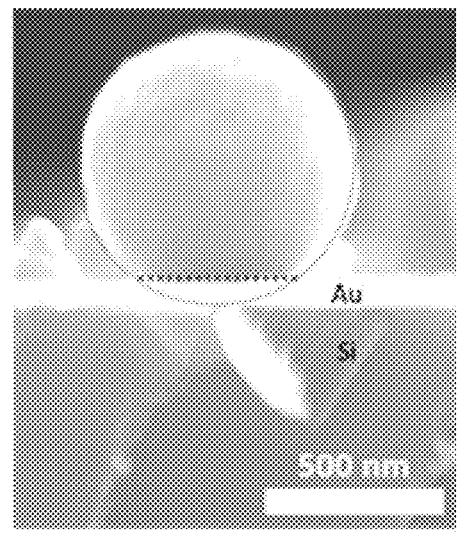
*Fig. 7A*          *Fig. 7B*

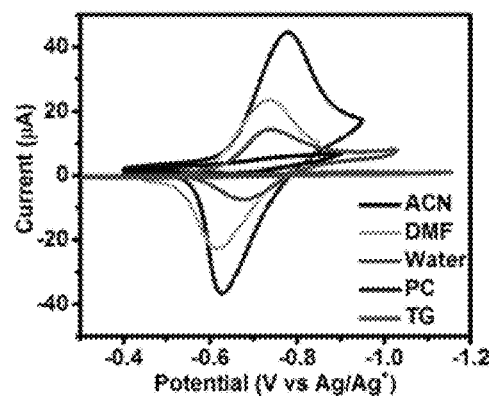
Fig. 9
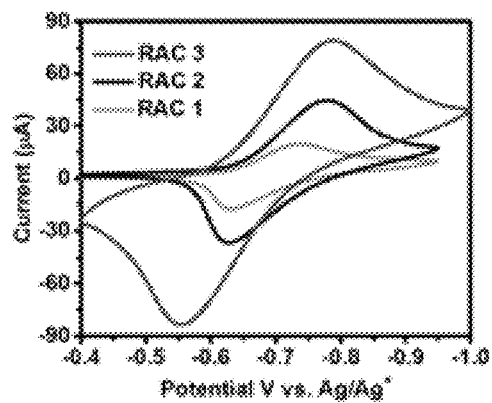 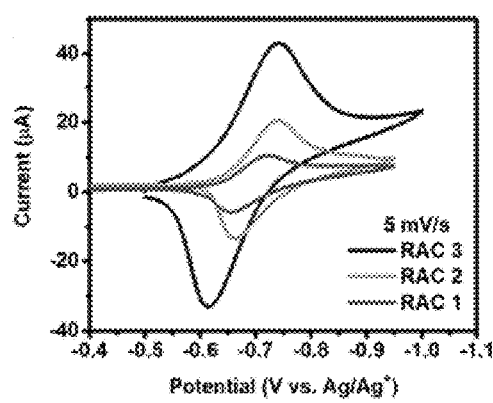
Fig. 10A          Fig. 10B

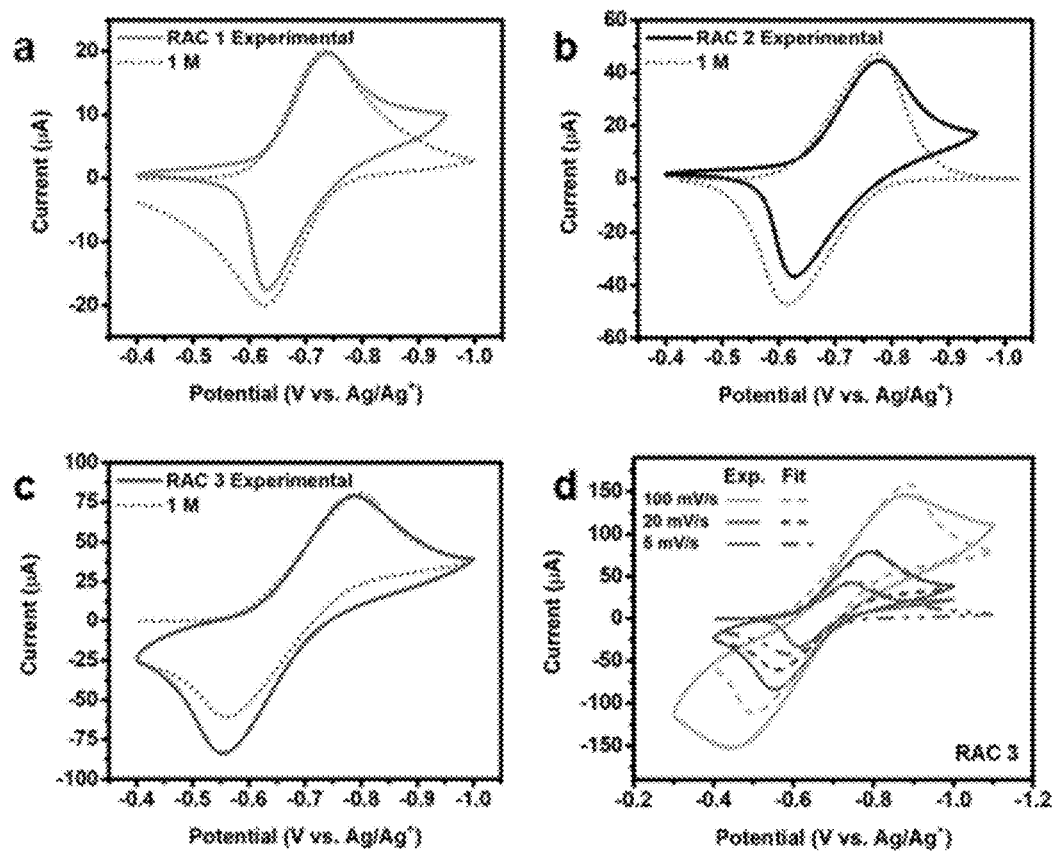
Fig. 11A-D

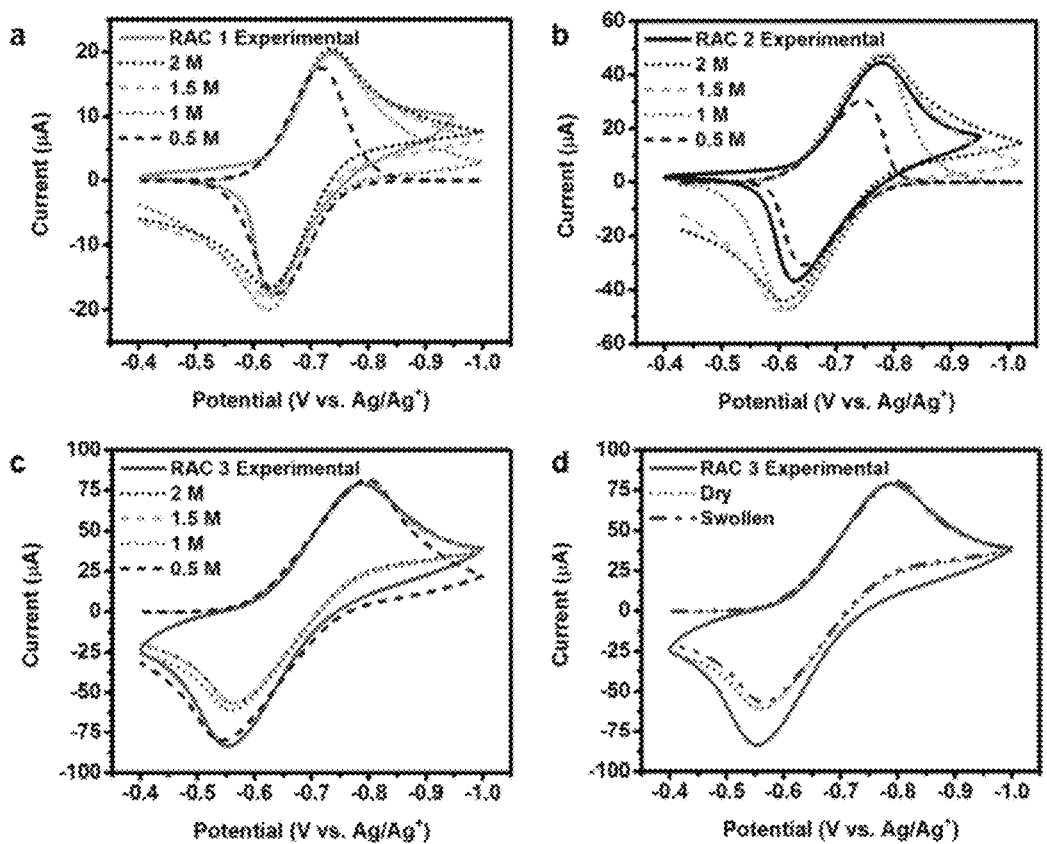
Fig. 12A-D

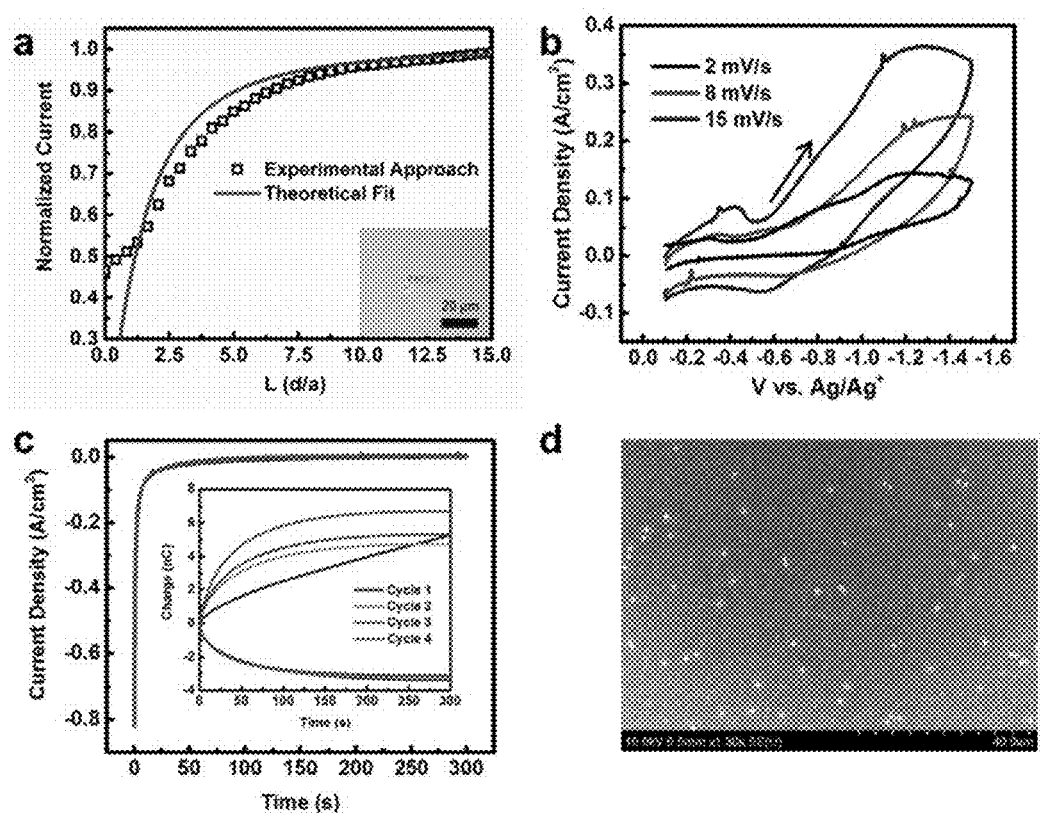
*Fig. 13A-D*

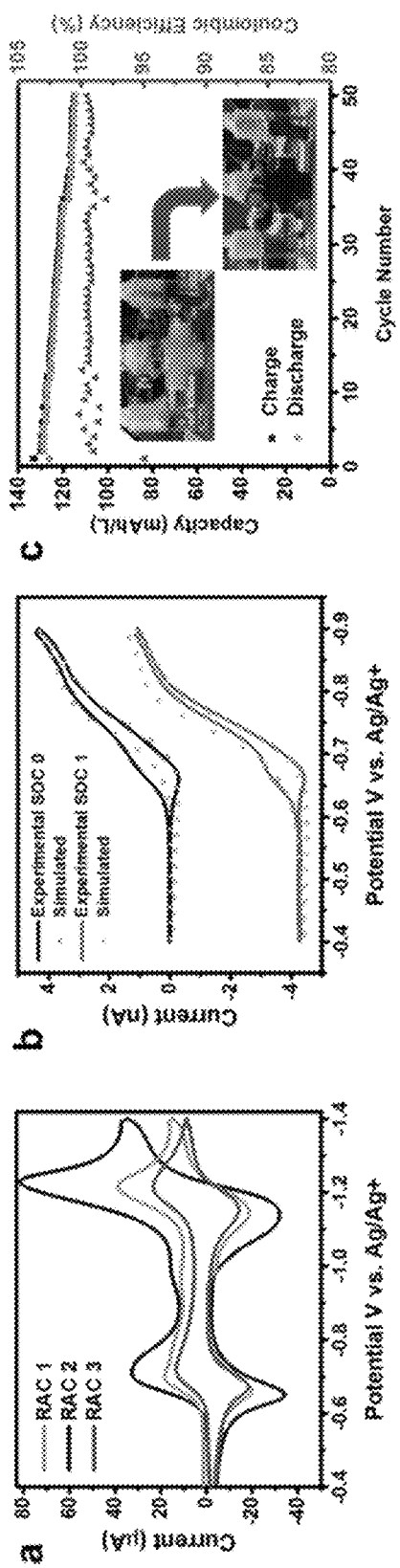
Fig. 14A-C

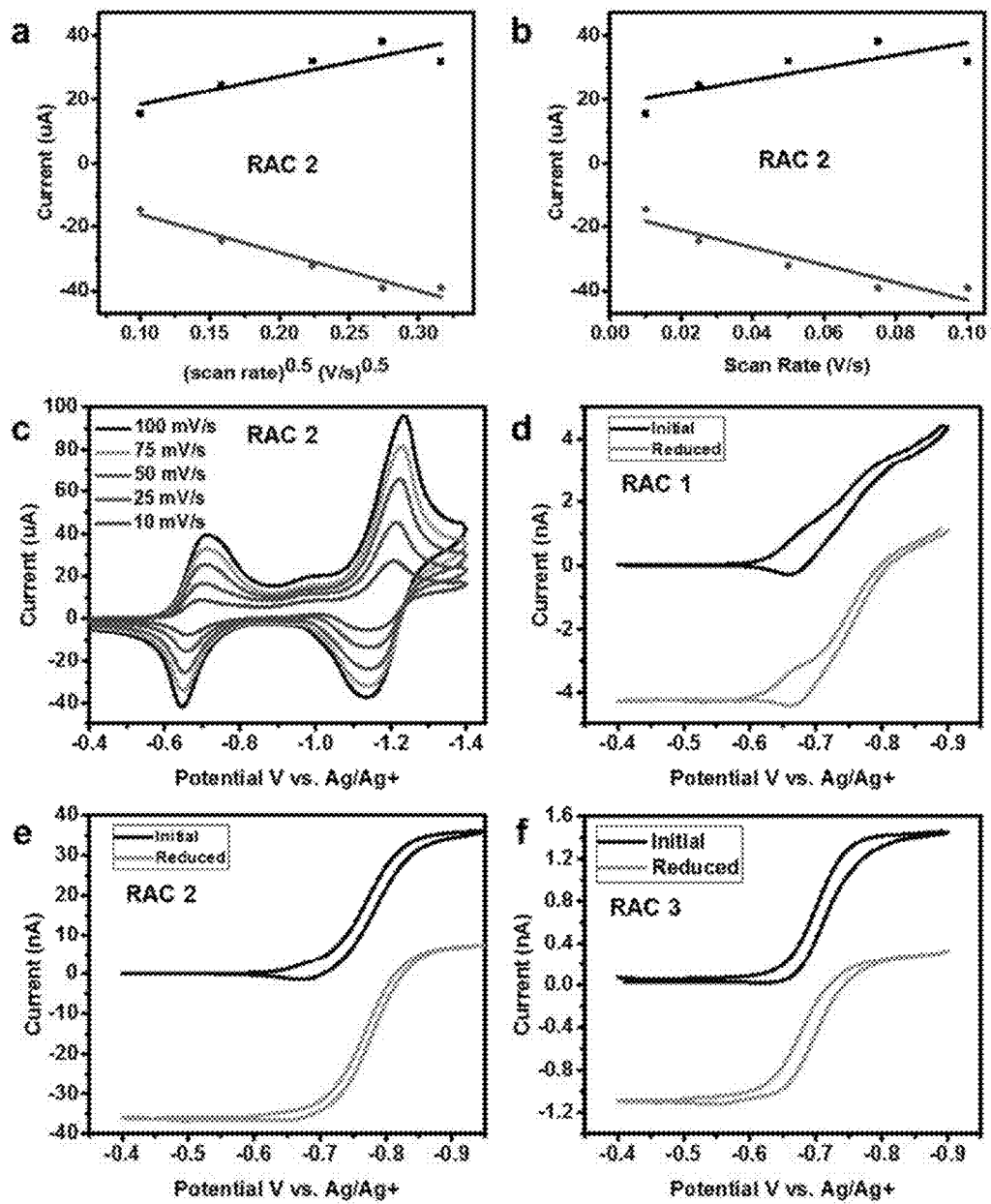
Fig. 15A-F

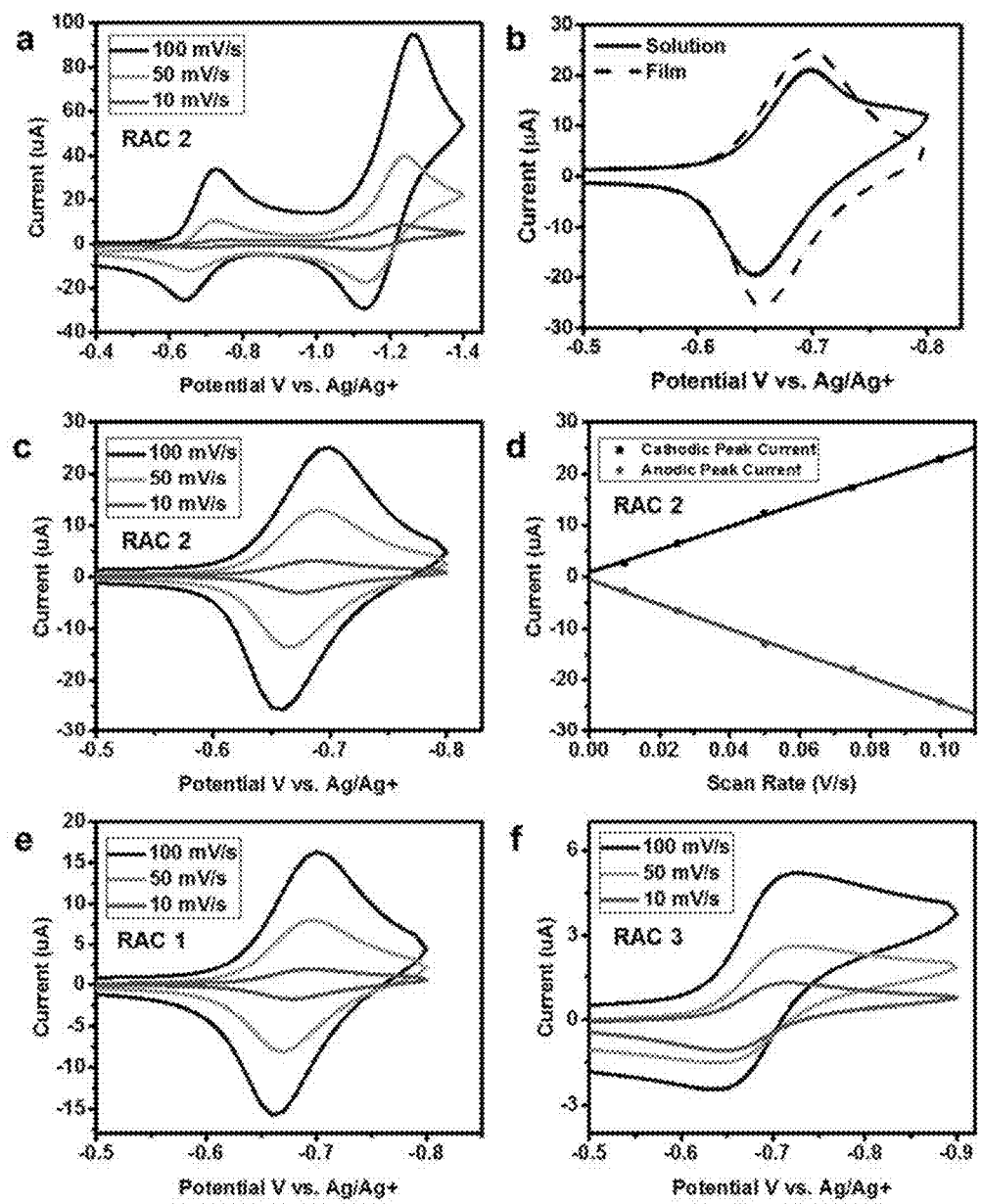
*Fig. 16A-F*

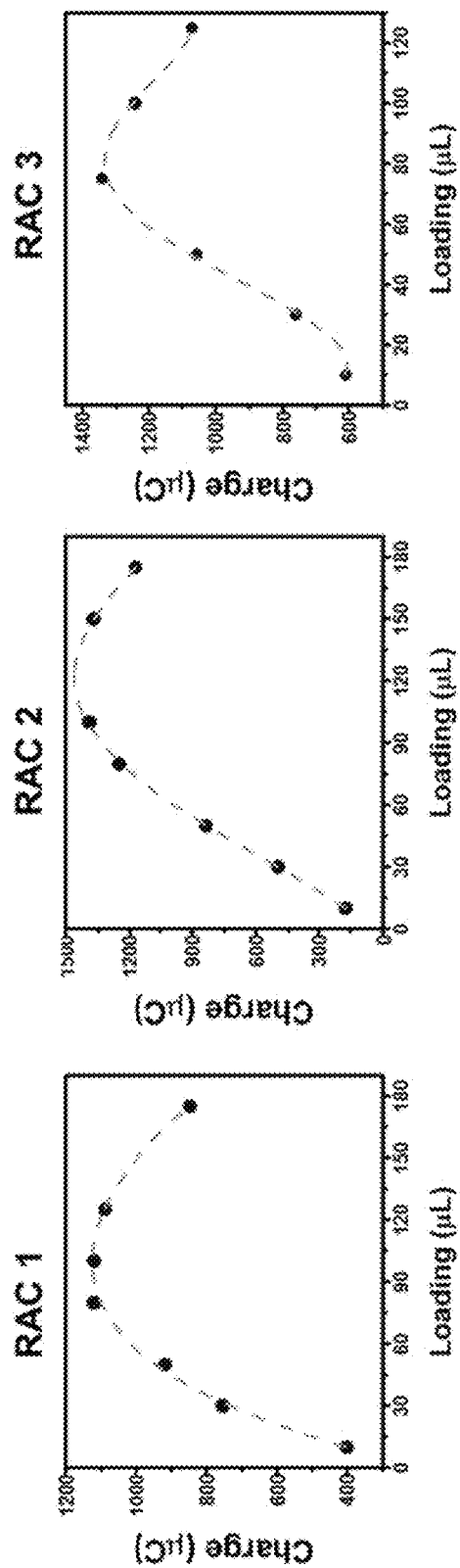
Fig. 18A-C

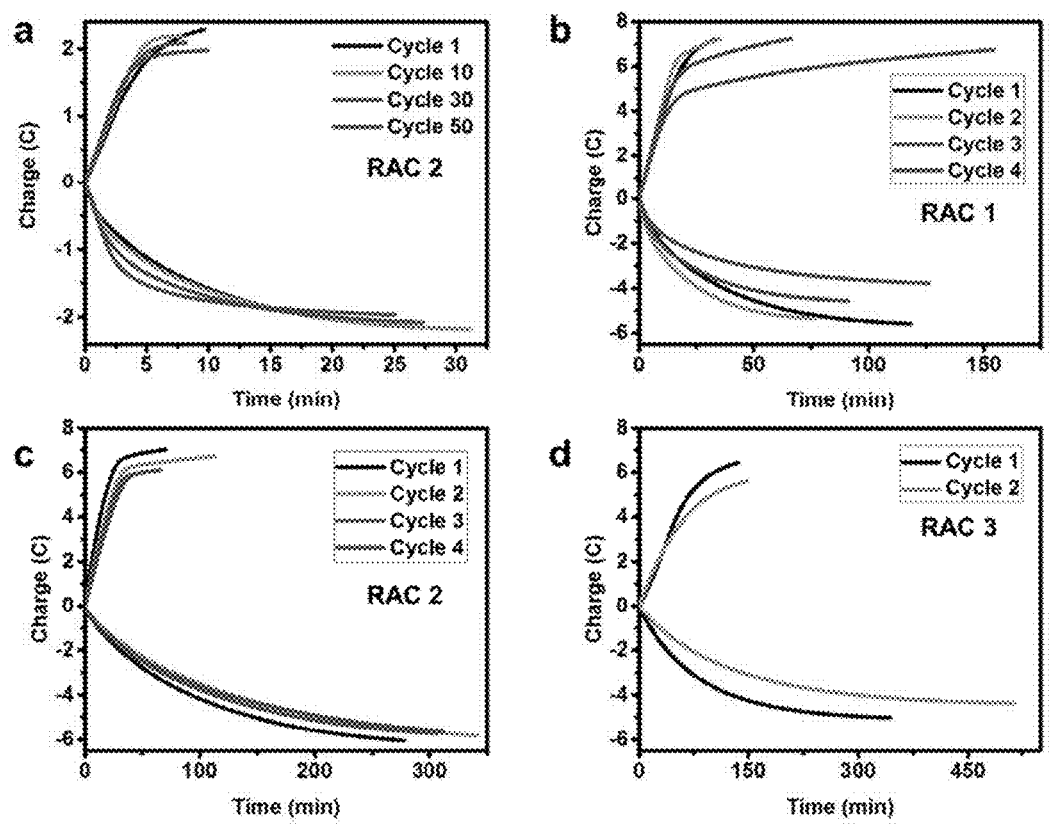
*Fig. 20A-D*

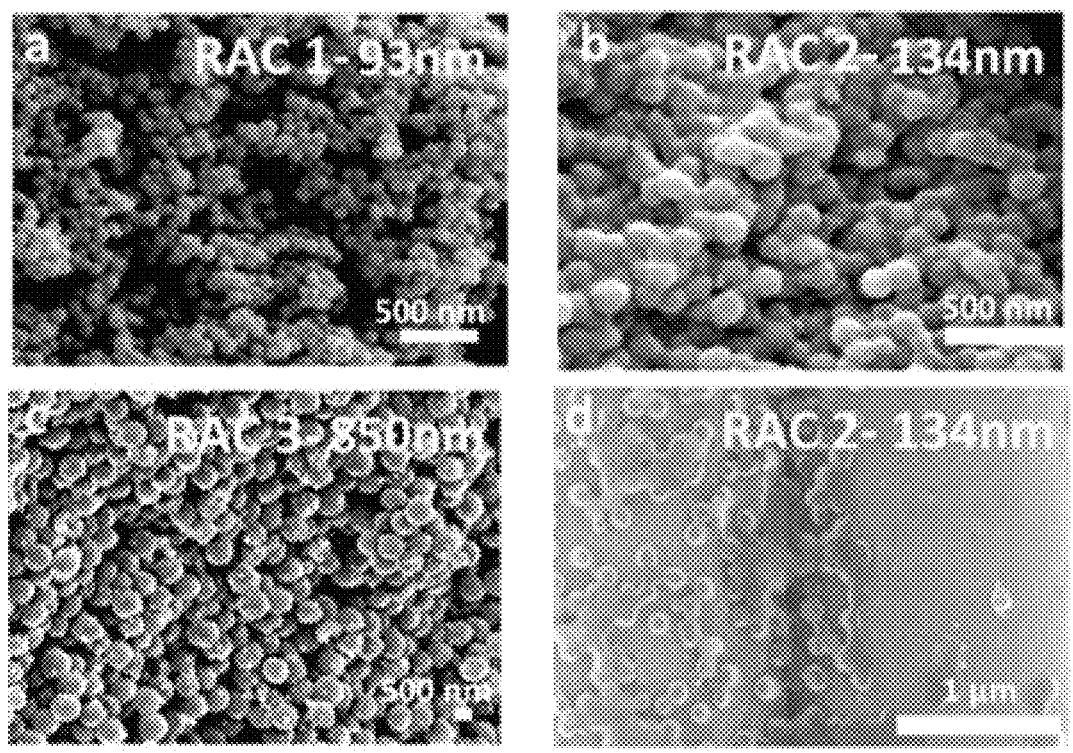
*Fig. 21A-D*

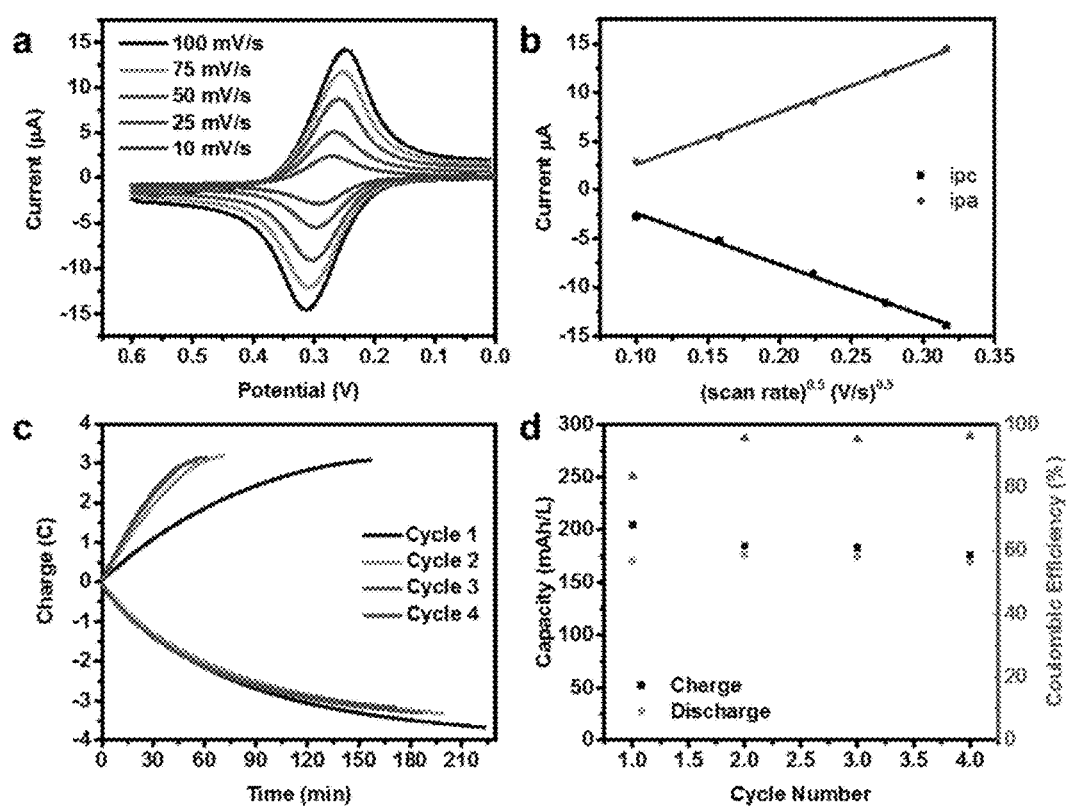
Fig. 23A-D

REDOX ACTIVE COLLOIDAL PARTICLES FOR FLOW BATTERIES

RELATED APPLICATIONS

This application is a continuation-in-part of U.S. patent application Ser. No. 15/000,910, filed Jan. 19, 2016, which claims priority under 35 U.S.C. § 119(e) to U.S. Provisional Patent Application No. 62/104,329, filed Jan. 16, 2015, which applications are incorporated herein by reference.

GOVERNMENT SUPPORT

This invention was made with government support under contract number DE-AC02-06CH11357 awarded by the Department of Energy. The government has certain rights in the invention.

BACKGROUND OF THE INVENTION

Redox flow battery technology offers many advantages for grid energy storage such as load-leveling, long durability, flexible operation, easy scalability, high-efficiency and low cost. In this technology, electrochemical energy is stored in highly concentrated solutions of reversible redox active molecules, and separated in compartments for the low and high electrochemical potential species. Non-aqueous redox flow batteries (NRFBs) are a potentially viable alternative to their aqueous counterparts (ARFBs) having a wide range of redox active species and electrolytes available for their design. The energy density of NRFBs can be dramatically increased by using redox couples that are highly soluble in organic solvents and that operate at electrode potentials well beyond the window of stability of aqueous electrolytes. Despite these exciting prospects, the lower ionic conductivity observed in non-aqueous electrolytes has prevented the wide-scale development of NRFBs.

Challenges in adapting commonly used ion exchange membranes (IEMs) as separators from aqueous to non-aqueous environments are greatly responsible for the paucity in studies of NRFBs. The role of the separator is to physically and electronically isolate the high and low potential redox species compartments. This prevents the mixing of the redox active components (crossover) and simultaneously provides high electrolyte ionic conductivity for minimizing losses due to resistance to current flow. Using IEMs designed for aqueous environments, many of which are proton conductors, decreases the power density of NRFBs by one order of magnitude compared to ARFBs. Moreover, IEMs are expensive and they contribute to ~20% of the battery cost.

Finding improvements in the performance of IEM's is an active research area, but an alternative membrane for NRFBs based on electrolyte size-selectivity rather than ionic-selectivity could be significantly beneficial. Size-selectivity using nano-porous membranes has been introduced recently in aqueous vanadium redox flow batteries for separating proton transport from that of larger vanadium cations. A strong emphasis is placed on the complex design of these membranes so they can adjust their sterics and electrostatics to effectively discriminate the redox active species, however this adds to the cost and complexity of the device. Accordingly, there is an ongoing need for new, more efficient, redox flow batteries. For example, an alternate approach in which the size of the redox active species is varied through a chemically-flexible synthetic polymer approach is needed in the art. Such a new strategy would de-emphasize membrane design and enable an insightful exploration of the properties of potential redox active candidates.

SUMMARY

The invention provides a redox flow battery comprising a first and a second chamber separated by a microporous or nanoporous size-exclusion membrane, wherein the first and second chambers each contain a non-aqueous solvent, a charge balancing ion, and an electrode; and wherein the first chamber contains one or more colloidal particles suspended in the non-aqueous solvent, wherein the colloidal particles are redox-active viologen-based polymer particles, redox-active ferrocene-based polymer particles, or a combination thereof, and wherein at least one of colloidal particles comprises a first polymer chain crosslinked with a second polymer chain.

In one embodiment, the one or more colloidal particles are redox-active viologen-based polymer particles. In another embodiment, the one or more colloidal particles are redox-active ferrocene-based polymer particles. In further embodiments, the colloidal particles can be a combination of redox-active viologen-based polymer particles and redox-active ferrocene-based polymer particles.

In one embodiment, the first polymer chain and the second polymer chain comprise the same type of monomer. In another embodiment, the first polymer chain and the second polymer chain comprise a different type of monomer.

In various embodiments, at least one of the colloidal particles comprises a third polymer chain crosslinked with the first polymer chain, the second polymer chain, or both. The first polymer chain, the second polymer chain, and the third polymer chain can be from the same type of monomer, or from different types of monomers.

In one embodiment, at least one of the colloidal particles comprises a redox-active viologen-based polymer particle comprising Formula I

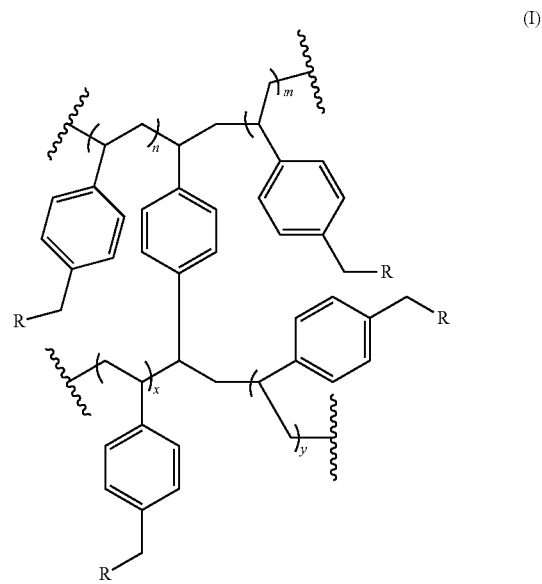

wherein R is

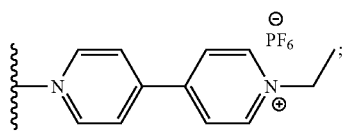

and m, n, x, and y are each independently positive integers that provides sufficient cross-linking within the particle such that particle has a diameter of about 10 nm to about 100 µm. In another embodiment, at least one of the colloidal particles comprises a redox-active-ferrocene-based polymer particle comprising Formula I,
wherein R is

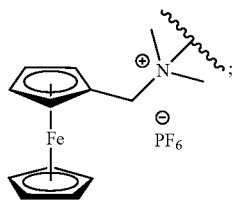

and m, n, x, and y are each independently positive integers that provides sufficient cross-linking within the particle such that particle has a diameter of about 10 nm to about 100 µm.

The charge balancing ion of the flow battery can include one or more of $Li^+$, $Na^+$, $K^+$, $Mg^{+2}$, $Ca^{+2}$, $NH_4^-$, and $N(R_4)_4^+$ wherein each $R_4$ is independently H, alkyl, aryl, or pyridinium.

In various embodiments, the first and second chambers of the flow battery contain an electrolyte solution comprising anions selected from $BF_4^-$, $PF_6^-$, $ClO_4^-$, $AsF_6^-$, $CF_3SO_3^-$, $N(SO_2CF_3)_2^-$, $N(SO_2CF_2CF_3)_2^-$, $B(C_2O_4)^{2-}$, $B_{12}X_nH_{(12-n)}^{2-}$, and $X^-$, wherein X is a halogen and n is a non-negative integer less than or equal to 12 (thus non-halogenated dodecaboranes can be employed).

The non-aqueous solvent can be acetonitrile, ethylene carbonate, propylene carbonate, butylene carbonate, dimethyl carbonate, diethyl carbonate, dipropyl carbonate, ethyl methyl carbonate, fluoroethylene carbonate, gamma-butyrolactone, N-methyl-2-pyrrolidone, N,N-dimethylformamide, N,N-dimethylacetamide, dimethylsulfoxide, dichloromethane, chloroform, benzene, toluene, xylene, chlorobenzene, nitrobenzene, methyl acetate, ethyl acetate, acetone, methyl ethyl ketone, cyclohexanone, diethyl ether, 1,2-dimethoxyethane, tetraethylene glycol dimethyl ether, bis(2-methoxyethyl) ether, tetrahydrofuran, 1,4-dioxane, methanol, ethanol, or a combination thereof.

The invention also provides an operating method of a redox flow battery system comprising a first and a second chamber separated by a microporous or nanoporous size-exclusion membrane, wherein the first and second chambers each contain an electrode, the method comprising:

pumping a first liquid electrolyte into the first chamber and a second liquid electrolyte into the second chamber such that the first liquid electrolyte and the second liquid electrolyte are mixed in either the first chamber, the second chamber, or both by at least one of the first and second liquid electrolyte migrating through the membrane thereby producing electricity;

wherein the first electrolyte comprises a plurality of colloidal particles and a charge balancing ion dispersed in a non-aqueous solvent, and wherein less than about 20 percent of the colloidal particles in the first liquid electrolyte move from the first chamber through the membrane and into the second chamber.

In one embodiment, less than about 10 percent of the colloidal particles in the first liquid electrolyte move from the first chamber through the membrane and into the second chamber. In another embodiment, less than about 5 percent of the colloidal particles in the first liquid electrolyte move from the first chamber through the membrane and into the second chamber. In yet another embodiment, less than about 1 percent of the colloidal particles in the first liquid electrolyte move from the first chamber through the membrane and into the second chamber.

In various embodiments, at least 50 percent of the colloidal particles have a widest diameter greater than the average pore diameter of the membrane. In various other embodiments, at least 25 percent, at least 40 percent, at least 60 percent, at least 75 percent, or at least 90 percent of the colloidal particles have a widest diameter greater than the average pore diameter of the membrane.

In one embodiment, the flow battery system has a Coulombic efficiency of at least 90% and a capacity of at least 90%. A single charge and single discharge of the flow battery constitute a single cycle of the battery. Both compartments of the system will typically contain equal concentration of RAC (active material) and equal concentration of supporting electrolyte salts when assembled. Electroneutrality should maintain this concentration balance throughout cycling by electrolyte movement through the separator.

The invention additionally provides an electrolyte composition for use in a redox flow battery comprising a plurality of colloidal particles and charge balancing ions dispersed in a non-aqueous solvent; wherein the colloidal particles comprise redox-active viologen-based polymer particles, redox-active ferrocene-based polymer particles, or a combination thereof. The plurality of colloidal particles can be about 0.5 weight percent to about 50 weight percent with respect to the non-aqueous solvent. The viscosity of the electrolyte can be less than about $10^5$ Pa s; and at least 50% of the colloidal particles can have a diameter that is at least 20 nm.

The plurality of colloidal particles can be about 5 weight percent to about 40 weight percent in the non-aqueous solvent. In another embodiment, the plurality of colloidal particles can be about 10 weight percent to about 30 weight percent in the non-aqueous solvent. In various embodiments, at least one of colloidal particles comprises a first polymer chain crosslinked with a second polymer chain, and the first polymer chain and the second polymer chain can be the same type of monomer.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

FIG. 6. ATIR-IR spectra of polyvinyl benzyl chloride and RACs 1-3. RAC 1, 80 nm; RAC 2, 135 nm; RAC 3, 827 nm.

FIGS. 7A and 7B show SEM cross-images of (a) RAC 2 monolayer film on Au and (b) RAC 3 over Au/Si substrate, respectively.

FIG. 9 shows cyclic voltammograms for RAC 2 at 20 mV/s in 0.1 M LiBF4 (organic solvents) and 0.1 M KCl (water).

FIGS. 10A and 10B show cyclic voltammograms for each size of viologen-based RAC (RACs 1-3) in 0.1 M LiBF4 in acetonitrile at different scan rates (a) 20 mV/s and (b) 5 mV/s, respectively.

FIGS. 11A-C show plausible fits when assuming the film concentration of 1.0 M, close to the experimentally-obtained value. FIG. 11D compares the experimental (solid line) cyclic voltammograms with simulated (dashed line) cyclic voltammographs using $D_{CT}=8.0\times10^{-11}$ cm$^2$/s at varying scan rates.

FIG. 12A-D. Monolayer film comparison to theory. (a-c) Graphical representation of Table 4 at dry RAC diameters. All plots show experimental CV at 20 mV/s for each RAC compared to theoretical fits at four concentrations with corresponding $D_{CT}$ values shown in Table 4. a. RAC 1. b. RAC 2. c. RAC 3. d. Example of thickness variation's effect on simulated curves. Parameters: 20 mV/s, C*: 1.0 M, $D_{CT}$: $8\times10^{-1}$ cm$^2$/s, thicknesses: 827 nm (dry) or 1366 nm (swollen). $D_{CT}$ values remained valid at both dry and swollen diameter film thicknesses indicating that the thickness has only minor influences on the response at determined charge transfer diffusion parameters.

FIG. 13A-D. Scanning electrochemical microscopy (SECM) of RAC 3. a. A successful approach to particles on the glass substrate gives negative feedback. b. CVs at various scan rates on approached RAC. c. Chronoamperometric transients from the discharges at –0.1 V vs. Ag/Ag$^+$ indicate starting current densities of 0.8 mA/cm$^2$. Inset: Chronocoulometric transients taken at –0.89 V and –0.1 V vs. Ag/Ag$^+$ (0.1 M AgNO$_3$) reversibly. d. SEM of RAC 3-coated glass substrate post experiment.

FIGS. 14A-C and FIGS. 15A-F show electrochemical properties of RACs 1-3.

FIGS. 16A-F show electrochemical adsorption properties of RACs 1-3.

FIGS. 18A-C show the effect of film loading on electrochemical properties for RAC 1, RAC 2, and RAC 3, respectively.

FIGS. 20A-D shows charge storage in RACs 1-3.

FIGS. 21A-C show SEM images of RACs 1-3, respectively, after multiple charge/discharge cycles. FIG. 21D shows RAC 2 adsorbed onto carbon felt electrode after 50 cycles.

FIGS. 23A-D show the electrochemical properties of RAC 4.

DETAILED DESCRIPTION

Figure 1:
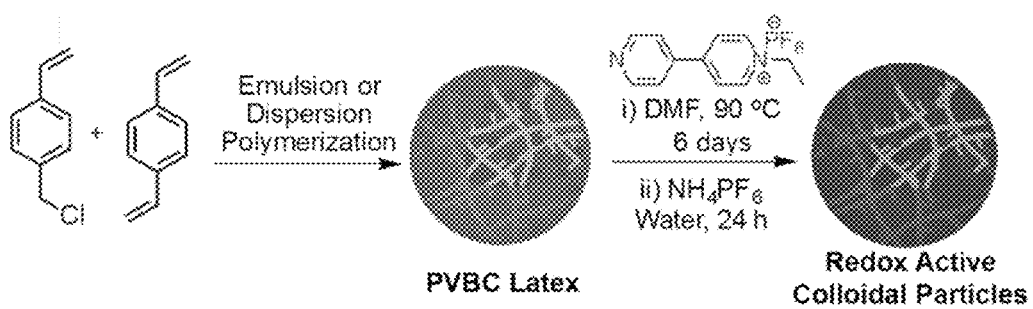
FIG. 1. A schematic for the synthesis of polyvinyl benzylchloride and viologen-based redox active colloidal particles.

Versatile and readily available battery materials compatible with a range of electrode configurations and cell designs are desirable for renewable energy storage. Disclosed herein is a promising class of materials based on redox active colloids (RACs) that are inherently modular in their design and overcome challenges faced by small-molecule organic materials for battery applications, such as crossover and chemical/morphological stability. RACs are crosslinked polymer spheres, synthesized with uniform diameters between 80 and 800 nm, and exhibit reversible redox activity as single particles, as monolayer films, and in the form of flowable dispersions. Viologen-based RACs display reversible cycling, accessing up to 99% of their capacity and 99±1% coulombic efficiency over 50 cycles by bulk electrolysis owing to efficient, long-distance intra-particle charge transfer. Ferrocene-based RACs paired with viologen-based RACs cycled efficiently in a non-aqueous redox flow battery employing a simple size-selective separator, thus demonstrating a possible application that benefits from their colloidal dimensions. The unprecedented versatility in RAC synthetic and electrochemical design opens new avenues for energy storage.

There is increasing interest in versatile electrical energy storage materials that readily adapt to different electrode designs as well as capacity and power needs. Organic-based redox materials are promising in this regard, with their wide-ranging electrochemical potentials in non-aqueous electrolytes and molecularly tunable properties. However, small organics display pervasive and detrimental material crossover, which limits their long-term use. Disclosed herein are redox active colloids (RACs), a promising class of polymer-based particles that store energy efficiently and reversibly. RACs act as discrete charge carriers that incorporate redox pendants for facile charge transport within a well-defined 3D geometry. These particles are structurally stable, exhibit high charge density, and retain the redox signatures of the constituent monomer, easily varied via organic synthesis.

Combining efficient energy storage with a high degree of morphological control makes RACs a conceptually promising building block deployable in various modalities, including individual particles, well-defined particle films, and redox active dispersions. This versatility addresses several challenges faced by stationary and flow battery materials. Their microscale dimensions dramatically decrease the pervasive and detrimental material crossover observed across separating membranes when small-molecules are used as redox materials. Unlike organic nanocrystals which disintegrate during charge/discharge cycling, RACs retain their morphological integrity due to their cross-linking. In contrast to macromolecules such as dendrimers, micelles and polymers, RACs offer a wider range of sizes, spanning from tens to thousands of nanometers.

RAC dispersions, with tunable inter-particle interactions and rheological properties are attractive candidates for emerging non-aqueous flow battery technologies that rely on size exclusion rather than ion exchange membranes. A major challenge in redox flow batteries is simultaneously decreasing resistive losses due to electrolyte transport through the membrane that separates anolyte and catholyte, while blocking the redox species from crossing over compartments. Because of the low conductivity of organic electrolytes, this challenge is exacerbated in non-aqueous redox flow batteries (NRFBs). We recently demonstrated that inexpensive nanoporous separators enabled a size-selective strategy in NRFBs when using redox active polymers (RAPs) of 8 to 14 nm in diameter as storage media. Nanopores allowed the unhindered transport of supporting electrolyte, while RAPs largely remained in their half-cell compartment, displaying cross-over values as low as 7%. A polymer-based size-exclusion flow battery has been demonstrated recently. Here, we explore how the larger dimensions attainable with RACs show promise in size-exclusion flow batteries by greatly reducing crossover while preserving the redox properties of its small-molecule constituents. Further, the ability to shuttle charge in discrete units capable of conforming to various electrode designs makes RACs immediately of interest to a broad range of applications in electrochromic devices, redox sensors, and as catalysts, amongst others.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit.

The term "about" can refer to a variation of +5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values, e.g., weight percentages, proximate to the recited range that are equivalent in terms of the functionality of the individual ingredient, the composition, or the embodiment. The term about can also modify the end-points of a recited range as discuss above in this paragraph.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

An "effective amount" refers to an amount effective to bring about a recited effect, such as an amount necessary to form products in a reaction mixture or to bring about an electrochemical reaction. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

As used herein, a "separator" is a porous size-exclusion material that serves to separate the anode and cathode space of the battery. The separator substantially retains redox active polymers and colloidal particles to the compartment of the battery that contains them. Additionally, the separator should be highly permeable to conducting salts of the electrolyte that serves for charge equalization (i.e., the anions and cations of the conducting salt). The separator thus distinguishes between the larger redox active components and the smaller ions of the electrolyte solution based on size and/or hydrodynamic radius.

A "viologen-based polymer" is a polymer such as a poly(vinylbenzyl) polymer linked to an alkyl viologen. Viologens are bipyridyl derivatives, in particular the 4,4'-bipyridyl derivatives that are alkyl-substituted in the 4,4'-position, e.g., with an ethyl group. The viologens can be also substituted with aryl, alkyl(aryl) (e.g., benzyl), alkoxy-substituted alkyl, and other suitable groups whose starting material includes a suitable leaving group to bond to a nitrogen of the viologen.

A "ferrocene-based polymer" is a polymer such as a poly(vinylbenzyl) polymer linked to a metallocene, such as ferrocene. A metallocene is a type of organometallic chemical compound consisting of two cyclopentadienyl rings bound on opposite sides of a central metal atom. A metallocene is a compound typically consisting of two cyclopentadienyl anions (Cp, which is $C_5H_5^-$) bound to a metal center (M) in the oxidation state II, with the resulting general formula $(C_5H_5)_2M$. Ferrocene is an organometallic compound with the formula $Fe(C_5H_5)_2$. Such organometallic compounds are also known as sandwich compounds.

Non-Aqueous Redox Flow Batteries.

Non-aqueous redox flow batteries (NRFB) are electrochemical energy stores. The components required for establishing potential at the electrodes of the battery are dissolved or suspended redox-active species that can be converted into their other redox state in an electrochemical reactor during the charging or discharging process. For this purpose, the electrolyte solutions (catholyte, anolyte) can be actively pumped from a supply tank to the electrodes. The anode space and cathode space are separated in the reactor by a porous size-selective membrane. As long as electrolyte solution is pumped, power can be taken off the battery. The charging process is simply the reverse of this process. The quantity of energy that can be stored in a NRFB is therefore directly proportional to the size of the storage tank. The power that can be taken off is a function of the size of the electrochemical reactor.

The construction of redox flow batteries is well known and has been described in detail, for example, by Darling et al., "Pathways to low cost electrochemical energy storage: a comparison of aqueous and nonaqueous flow batteries", *Energy Environ. Sci.*, 2014, 7, 3459-3477, and in U.S. Patent Application Publication No. 2013/0224538 (Jansen et al.), which are incorporated herein by reference.

In one embodiment, the invention provides a non-aqueous redox flow battery comprising:

a negative electrode immersed in a non-aqueous liquid negative electrolyte, a positive electrode immersed in a non-aqueous liquid neutral or positive electrolyte, and a separator between the negative and positive electrolytes, which separator achieves separation by size exclusion (size exclusion separator);

the negative electrode positioned within a negative electrolyte chamber ("NE chamber") defined by a first housing and containing the negative electrolyte, e.g., a RAC as described herein, the NE chamber is connecting with a first negative electrolyte reservoir ("NE reservoir") and a second NE reservoir such that the first NE reservoir, the NE chamber, and the second NE reservoir can be placed in fluid-flow communication and collectively define a negative electrolyte circulation pathway;

a first pump being operably positioned within the negative electrolyte circulation pathway to circulate the negative electrolyte back and forth between the first NE reservoir and the second NE reservoir over the negative electrode;

the positive electrode being positioned within a positive electrolyte chamber ("PE chamber") defined by a second housing and containing the neutral or positive electrolyte, the PE chamber connecting with a first positive electrolyte reservoir ("PE reservoir") and a second PE reservoir such that the first PE reservoir, the PE chamber, and the second PE reservoir can be placed in fluid-flow communication and collectively define a positive electrolyte circulation pathway;

a second pump being positioned within the positive electrolyte circulation pathway to circulate the positive electrolyte back and forth between the first PE reservoir and the second PE reservoir over the positive electrode;

the negative and positive electrolytes each independently comprising an electrolyte salt and an electrochemically stable organic solvent; and the NE chamber and the PE chamber being separated from one another by the size exclusion separator, such that cations from the electrolyte salt can flow back and forth between the NE chamber and the PE chamber to balance charges resulting from oxidation and reduction of the redox reactants during charging and discharging of the battery; wherein the redox reactants are one or more RACs described herein.

The solvent for the RACs should be a solvent in which the RAC can form a suitable and stable emulsion, microemulsion, or fine dispersion. The non-aqueous liquid electrolyte solution or suspension of the non-aqueous redox flow battery includes an organic solvent. The organic solvent can be a carbonate solvent, a nitrile, an ether, an aromatic compound, an ester, or a combination thereof. Specific examples of suitable carbonate solvents include, but are not limited to, propylene carbonate, ethylene carbonate, ethyl methylcarbonate, diethylcarbonate, and dimethylcarbonate. Examples of suitable nitriles include, but are not limited to, acetonitrile, 1,4-dicyanobutane, and 1,6-dicyanohexane. Examples of suitable ethers can include, but are not limited to, diethylether, 1,4-dioxane, diethylene glycol diethyl ether, ethyl ether, and tetrahydrofuran. Examples of suitable aromatic compounds include, but are not limited to, benzene, toluene, and 1,2-dichlorobenzene. An example of a suitable glycol includes, but is not limited to, triethylene glycol. Examples of suitable esters include, but are not limited to, ethyl acetate and t-butyl acetate. Other solvents suitable for use in the non-aqueous redox flow battery described herein are described by Darling et al., Pathways to low cost electrochemical energy storage: a comparison of aqueous and nonaqueous flow batteries, *Energy Environ. Sci.*, 2014, 7, 3459-3477, incorporated by reference.

In some embodiments, the non-aqueous solvent is a polar solvent. Suitable polar organic solvents can include, but are not limited to, acetonitrile, acetone, tetrahydrofuran, acetic acid, acetyl acetone, 2-aminoethanol, aniline, anisole, benzene, nitrobenzene, benzonitrile, benzyl alcohol, 1-butanol, 2-butanol, iso-butanol, 2-butanone, t-butyl alcohol, carbon disulfide, carbon tetrachloride, chlorobenzene, chloroform, cyclohexane, cyclohexanol, cyclohexanone, di-n-butylphthalate, 1,1-dichloroethane, dichloroethane, diethylamine, diethylene glycol, diglyme, dimethoxyethane (glyme), tetraglyme, N,N-dimethylaniline, dimethylformamide (DMF), dimethylphthalatem, dimethylsulfoxide (DMSO), dioxane, ethanol, ether, ethyl acetate, ethyl acetoacetate, ethyl benzoate, ethylene glycol, heptane, hexane, methanol, methyl acetate, methyl t-butyl ether (MTBE), methylene chloride, 1-octanol, pentane, 1-pentanol, 2-pentanol, 3-pentanol, 2-pentanone, 3-pentanone, 1-propanol, 2-propanol, pyridine, tetrahydrofuran (THF), toluene and p-xylene.

The non-aqueous redox flow batteries described herein include a microporous or nanoporous separator. Suitable separator materials include polyolefins such as polyethylene and polypropylene, ethylene-propylene copolymers, polyimides, polyvinyldifluorides, and the like, and other materials that do not react with the battery electrolytes and solvents. The separators can be in the form of membranes, including bi-layer and tri-layer membranes, sheets, films, or panels. Other suitable materials include porous ceramics, porous insulated metals, and zeolites. Other suitable porous films, panels or mesh will be readily understood by those skilled in the art.

A variety of electrolytes can be used to provide the electrolyte solution of the non-aqueous redox flow battery. The non-aqueous electrolyte solution can be, for example, a metal halide salt or an ammonium halide salt. Non-limiting examples of the salt include $LiBF_4$, $NaBF_4$, $LiPF_6$, $NaPF_6$, lithium bis(oxalato)borate, tetra-n-butylammonium hexafluorophosphate, tetra-n-butylammonium bromide, tetra-n-butylammonium tetrafluoroborate, and the like. In some embodiments, the metal halide salt comprises a cation such as, for example, $Li^+$ and/or $Na^+$, $K^+$, $Mg^{+2}$, $Ca^{+2}$, $NH_4^+$, $N(alkyl)_4^+$, and the like. The metal halide salt can include anions such as, for example, $BF_4^-$, $PF_6^-$, $ClO_4^-$, $AsF_6^-$, $CF_3SO_3^-$, $N(SO_2CF_3)_2^-$, $N(SO_2CF_2CF_3)_2^-$, $B(C_2O_4)^{2-}$, and $B_{12}X_6H_{(12-n)}^{2-}$, wherein X is a halogen and n is a non-negative integer less than or equal to 12. The discussion of electrolytes and electrolyte solutions described herein typically refer to $LiBF_4$, but any of the aforementioned salts can be used when suitable and effective.

In addition to the polyvinylbenzene polymer backbones described herein, other polymer backbones can be used for preparation of the redox active polymers and colloidal particles. Examples of compounds that can be used to prepare the polymer backbone of redox active species are polymers derived from ethylenically unsaturated carboxylic acids, or esters or amides thereof, e.g., polyacrylates, polymethacrylates, or polyacrylamide, as well as polymers derived from ethylenically unsaturated aryl compounds, e.g., polystyrene and substituted versions thereof, polymers derived from vinyl esters of saturated carboxylic acids or derivatives thereof, e.g., polyvinyl acetate or polyvinyl alcohol, polymers derived from olefins or bicyclic or polycyclic olefins, e.g. polyethylene, polypropylene or polynorbomene, polyimides derived from imide-forming tetracarboxylic acids and diamines, polymers derived from natural occurring polymers and their chemically modified derivatives, e.g., cellulose or cellulose ethers, and also polyurethanes, polyvinyl ethers, polythiophenes, polyacetylene, polyalkylene glycols, poly-7-oxanorbomene, polysiloxanes, polyalkylene glycol and derivatives thereof, e.g., ethers thereof, such as polyethylene glycol and derivatives thereof. Particularly useful classes of materials for the polymer backbone are polyacrylates, polymethacrylates, polystyrene, polyalkylene glycols and polyvinyl ethers, which can be substituted with leaving groups such as chlorides to link the polymers to redox active species such as ferrocenyl, nitrobenzene, isonicotinate, quinoxaline, phenylenediamine, or dimethoxy benzene moieties.

The redox flow battery described herein can be used in a variety of fields and for various applications. Uses of the flow batteries include the storage of electric energy for mobile and stationary applications. Examples of applications include uses in the field of electromobility, e.g., as energy store in land, air and water vehicles, uses as stationary energy store for emergency power supply, peak load equalization, and for the temporary storage of electric energy from renewable energy sources such as from photovoltaics and wind power. The redox flow batteries can be connected to one another in series or in parallel in a manner known to one of skill in the art. In some instances, the non-aqueous redox flow battery provides stability over about 100 cycles, 500 cycles, 750 cycles, 900 cycles, or 1000 cycles.

Redox Active Colloid Particles

Enhancing the ionic conductivity across the electrolyte separator in non-aqueous redox flow batteries (NRFBs) is essential for improving their performance and enabling their widespread utilization. Separating redox active species by size-exclusion without greatly impeding the transport of supporting electrolyte is a potentially powerful alternative to the use of poorly-performing ion-exchange membranes. However, this strategy has not been explored possibly due to the lack of suitable redox active species that are easily varied in size, remain highly soluble, and exhibit good electrochemical properties.

A RAC may be a cross-linked polymer particle that comprises at least two polymer chains linked with each other. The RAC may be formed a non-negative integer greater than or equal to two polymer chains. These polymer chains may be the same or different from each. In some instances, the polymer chains that are linked with each other to form the RAC are the same and prepared from the crosslinked poly(vinylbenzylchloride) and either ethyl viologen for viologen-based RACs (RACs 1-3) or ferrocene for ferrocene-based RACs (RAC 4). In some instances, the crosslinking of polymer chains within the RAC form a spherical RAC.

Characterization of RACs 1-3

Viologen-containing particles were prepared from ethyl-viologen and crosslinked poly(vinylbenzyl chloride) (xPVBC) latex particles via a modified, post-polymerization protocol (see Chonde et al., *J. App. Polym. Sci.* 1980, 25, 2407 and Margel et al., *J. Polym. Sci. A Polym. Chem.* 1991, 29, 347). Functionalized RACs (RACs 1-4) were prepared from crosslinked colloidal poly(vinylbenzyl chloride) (xPVBC) and respective pendants ethyl viologen (RACs 1-3) or (dimethylaminomethyl) ferrocene (RAC 4). Functionalization involved heating xPVBC with the pendant monomer precursor in a mixture of dimethylformamide and tetrahydrofuran followed by purification via centrifugation. FIG. 1 is a schematic of the reaction for synthesizing polyvinyl benzylchloride and viologen-based RACs.

Figure 2:
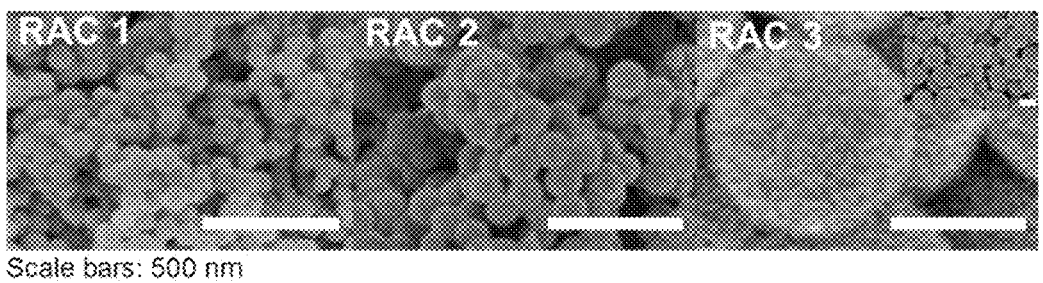
FIG. 2. SEM images of viologen-based RACs 1-3 in the dry state with particle diameter distributions of (a) 80±11, (b) 135±12, and (c) 827±71 nm, respectively.
Figure 3:
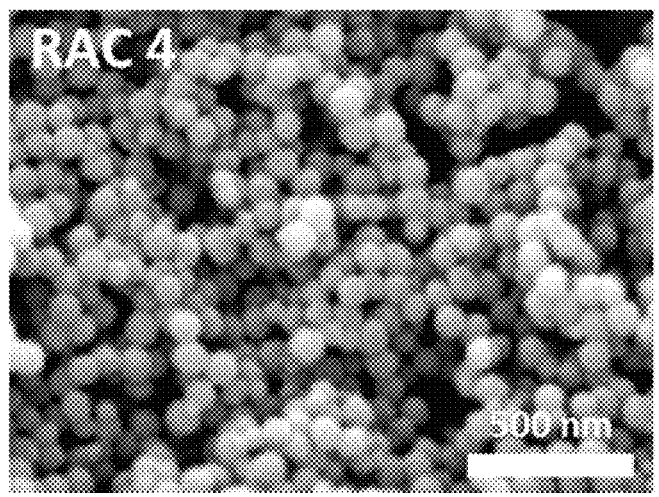
FIG. 3. SEM image of ferrocene-based RAC 4 with particle diameter distributions of 88±11 nm. Scale bar: 500 nm.

Three sizes of viologen RACs were produced and studied. FIGS. 2A-2C show SEM images of viologen based RACs 1-3 with particle diameter distributions of (a) 80±11, (b) 135±12, and (c) 827±71 nm, respectively, based on an average of 50 dry particles. FIG. 3 shows SEM image of ferrocene based RAC 4 with particle diameter distributions of 88±11 nm. Depending on the desired colloidal particle diameter, crosslinked xPVBC of varying diameters were synthesized by redox-initiated emulsion polymerization (see Chonde et al., *J. App. Polym. Sci.* 1980, 25, 2407) or dispersion polymerization (see Margel et al., *J. Polym. Sci. A Polym. Chem.* 1991, 29, 347.).

RACs were characterized by elemental analysis, ATR-IR, and UV-Vis spectroscopy. Particle size was determined in both the dry and swollen state. Dynamic Light Scattering (DLS) was used to characterize the swollen size of RACs. Crossover studies were done using a PermGear Side-Bi-Side cell and UV-Vis absorbance. All dispersion characterization measurements were done in acetonitrile and concentrations are defined as moles of redox active unit per liter.

Substantial, if not nearly or fully complete, substitution of PVBC with benzyl ethyl viologen or functionalization of RACs is desirable for high energy density and comparing electrochemical activity among RAC of different sizes. Percent functionalization for each particle population was substantial, close to 100% in many cases, as determined by elemental analysis, UV-Vis absorption, and ATR-IR. As shown in Tables 1.1 and 1.2, the amount of Cl in RACs 1-4 is minimal, if not zero (ranging from 0, 0.13, 0.14, and 0.15).

Figure 4:
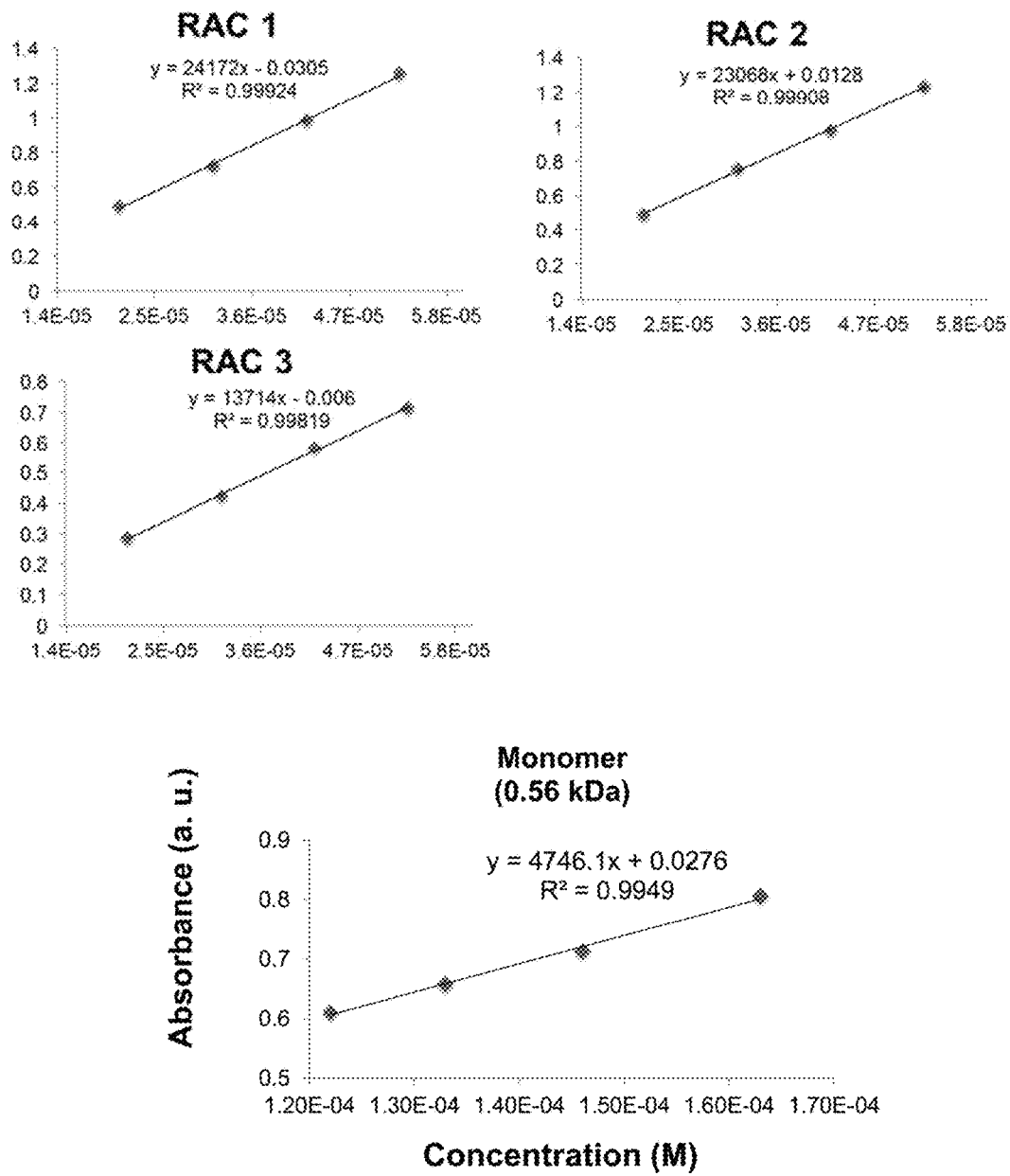
FIG. 4. Absorbance vs. concentration plots to determine molar extinction coefficient of monomer and RACs 1-3.

UV-visible absorption of monomer (benzyl ethyl viologen) and polymers (RACs 1-3) were recorded in acetonitrile at different concentrations as shown in FIG. 4 and their molar extinction coefficients were determined as shown in Table 2. For a given concentration of repeat units, the molar extinction coefficients of RACs 1-2 were found to be close to that of monomer, indicating the near-quantitative substitution of PVBC with benzyl ethyl viologen. Furthermore, IR and elemental analysis confirmed that the substitution is near-quantitative for all RACs (RAC1-3).

TABLE 2

Molar Extinction Coefficients of Monomer and RACs 1-3 in Acetonitrile.

| Sample | Molar extinction coefficient ($M^{-1}$ $cm^{-1}$) |
|---|---|
| Monomer | 25100 ± 600 |
| RAC 1-80 nm | 24100 ± 600 |
| RAC 2-135 nm | 23000 ± 500 |
| RAC 3-827 nm | 13700 ± 500 |

Figure 5:
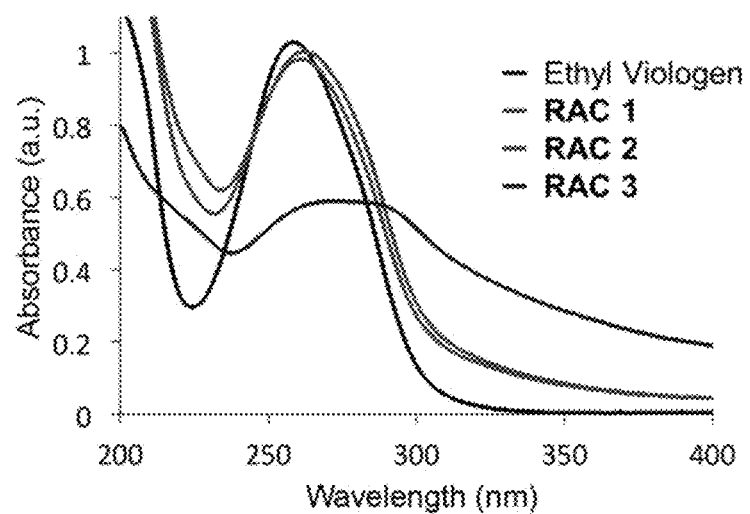
FIG. 5. Absorbance spectra of monomer benzyl ethyl viologen and RACs 1-3 at $4.22\times10^{-5}$ M in acetonitrile. RAC 1, 80 nm; RAC 2, 135 nm; RAC 3, 827 nm.
Figure 8A:
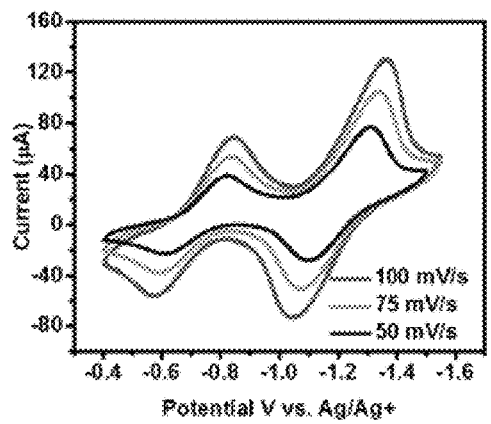
FIGS. 8A-D shows (a) cyclic voltammograms for RAC 2 that underwent two redox processes, (b) cyclic voltammograms for RAC 2 that underwent a single redox process, (c) peak current—scan rate of RAC 2 monolayer showing surface-confined contributions, and (d) peak current—scan rate of RAC 2 monolayer showing diffusing-limiting contributions.
Figure 8B:
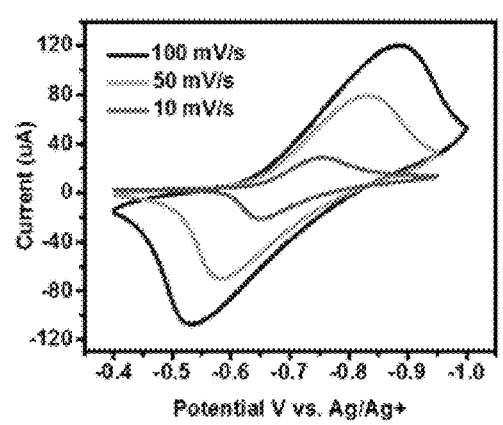
Figure 8C:
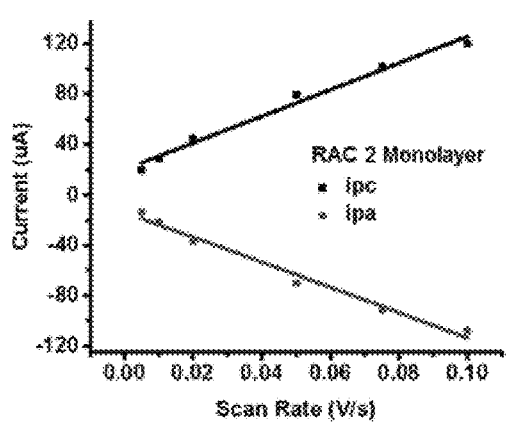
Figure 8D:
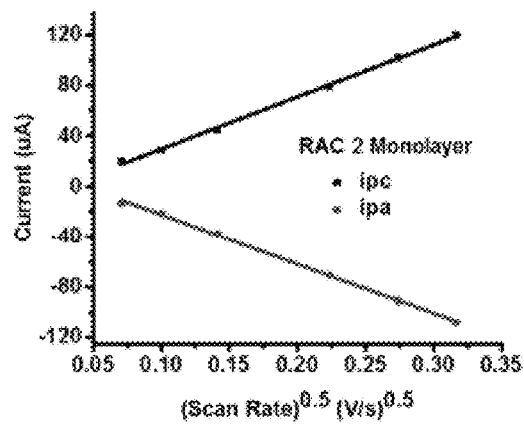

FIG. 5 shows UV-Vis absorbance spectra for benzyl ethyl viologen and RACs 1-3. RACs 1-2 show similar absorbance to benzyl ethyl viologen at the same repeat unit concentrations, indicating substantial substitution of PVBC with benzyl ethyl viologen or RAC functionalization. RAC 3 spectra shows a high degree of scattering with broadened peak and generally lower absorbance at wavelengths where peaks appear prominent for benzyl ethyl viologen and RACs 1-3, probably due to particle size of RAC 3 (Bohren, C. F.; Huffmann, D. R., *Absorption and scattering of light by small particles*. Wiley-Interscience: New York, 1983; Hulst, H. C. v. d., *Light scattering by small particles*. Dover: New York, 1981.). RAC 3 functionalization or substitution of PVBC with benzyl ethyl viologen may be best characterized by ATR-IR.

FIG. 6 shows the ATIR-IR spectra of polyvinyl benzyl chloride and RACs 1-3. As shown in FIG. 6, complete loss of the 1280 $cm^{-1}$ peak corresponding to the benzyl chloride was accompanied by growth of the 1650 $cm^{-1}$ peak arising

TABLE 1.1

Elemental (C, H, N, P, F, Cl) analysis of RACs 1-3.

| Sample | Element | C | H | N | F | P | Cl |
|---|---|---|---|---|---|---|---|
| RAC 1— 80 nm | Theoretical (%) | 42.58 | 3.74 | 4.73 | 38.49 | 10.46 | 0 |
| | Experimental (%) | 45.49 | 3.88 | 4.51 | 37.68 | 8.56 | 0.15 |
| | Difference | 2.91 | 0.14 | −0.22 | −0.81 | −1.9 | 0.15 |
| RAC 2— 135 nm | Theoretical (%) | 42.58 | 3.74 | 4.73 | 38.49 | 10.46 | 0.00 |
| | Experimental (%) | 42.60 | 3.81 | 5.23 | 37.78 | 10.42 | 0.13 |
| | Difference | 0.02 | 0.07 | 0.5 | −0.71 | −0.04 | 0.13 |
| RAC 3— 827 nm | Theoretical (%) | 42.58 | 3.74 | 4.73 | 38.49 | 10.46 | 0.00 |
| | Experimental (%) | 46.21 | 4.00 | 4.94 | 30.94 | 8.32 | 0.00 |
| | Difference | 3.63 | 0.26 | 0.21 | −7.55 | −2.14 | 0.00 |

TABLE 1.2

Elemental (C, H, N, P, Fe, F, Cl) Analysis of RAC 4.

| Sample | Element | C | H | N | Fe | P | F | Cl |
|---|---|---|---|---|---|---|---|---|
| RAC 4— 88 nm | Theoretical (%) | 52.3 | 5.19 | 2.77 | 11.05 | 6.13 | 22.56 | 0 |
| | Experimental (%) | 51.00 | 5.44 | 3.9 | 9.56 | 5.98 | 19.48 | 0.14 |
| | Difference | −1.3 | 0.25 | 1.13 | −1.49 | −0.15 | −3.08 | 0.14 | from the viologen quaternary amine. Nearly complete functionalization is not only desirable for high energy density, but also necessary for comparing the electrochemical activity between RACs of different sizes.

Table 3.1 shows particle sizes of RACs 1-3 based on dynamic light scattering. Table 3.2 shows the ratio of radius between DLS and SEM for each of RACs 1-4. The diameter of these particles in acetonitrile, measured by DLS analysis, was 1.7-2.2 times larger than the dry state, indicating significant swelling. Viologen RACs yielded loadings up to 40 wt % when dispersed in acetonitrile with $LiBF_4$ (corresponding molarity: 0.56 M or 15 Ah/L in 0.1 M $LiBF_4$). The discrete format and high dispersibility of RACs allowed us to probe their redox properties in well-defined films, deposits, and as bulk dispersions.

TABLE 3.1

Particle Sizes of RACs 1-3 based on Dynamic Light Scattering.
Sample concentration: 1 mg/mL in 9 mM $LiBF_4$ acetonitrile.
Particle size of RAC 4 is 212 ± 1 nm.
RACs Diameter from DLS (nm)

| Sample | As Prepared | Reduced | After multiple charge/ discharge cycles[a] |
|---|---|---|---|
| RAC 1-80 nm | 172 ± 27 | 196 ± 08 | 196 ± 67 |
| RAC 2-135 nm | 233 ± 28 | 262 ± 15 | 256 ± 61 |
| RAC 3-827 nm | 1372 ± 604 | 1367 ± 205 | 1366 ± 606 |

[a]After cycling experiments shown in FIG. 15.

Reduced RACs were prepared by bulk electrolysis using conditions listed for FIG. 15D-F (e.g., using a stirred 3-compartment cell with Pt mesh working electrode, carbon rod counter and $Ag/Ag^+$ (0.1M $AgNO_3$ MeCN) reference electrode. Overpotential used was −150 mV. Thus, the reduced particles were in a charged state.

TABLE 3.2

Ratio of radius determined from DLS to that of SEM.

| Sample | RAC 1-80 nm | RAC 2-135 nm | RAC 3-827 nm | RAC 4-88 nm |
|---|---|---|---|---|
| $R_{DLS}/R_{SEM}$ | 2.2 | 1.7 | 1.7 | 2.4 |

[a]$R_{DLS}$ from Table 3.1, As Prepared.

RAC Monolayer Reactivity.

Relatively well-ordered monolayer of each RAC on an Au/Si substrate was prepared. FIGS. 7A and 7B show SEM cross-images of (a) RAC 2 monolayer on an Au/Si substrate and (b) RAC 3 monolayer on Au/Si substrate, respectively. Cyclic voltammetry was used to investigate the intra-particle charge transfer among RACs within each monolayer in various organic solvents and water. FIGS. 8A-D shows (a) cyclic voltammograms for RAC 2 that underwent two redox processes, (b) cyclic voltammograms for RAC 2 that underwent a single redox process, (c) peak current—scan rate of RAC 2 monolayer showing surface-confined contributions, and (d) peak current—scan rate of RAC 2 monolayer showing diffusing-limiting contributions.

FIG. 9 shows cyclic voltammograms for RAC 2 at 20 mV/s in 0.1 M $LiBF_4$ (for each organic solvent) and 0.1 M KCl (water). Solvents tested were acetonitrile (ACN), N,N-dimethylformamide (DMF), propylene carbonate (PC), tetraglyme (TG). To determine whether solvents had any effect on the electrochemical properties of a RAC monolayer, certain variables were fixed for each solvent being tested, such as use of similar RAC 2 monolayer on Au/Si substrate and electrolyte concentration. FIG. 9 shows marked differences in cyclic voltammograms with different shapes and peak heights for RAC 2 in different solvents, suggesting charge accessibility of RAC is a function of the solvent used.

A correlation between peak height and the inverse of solvent viscosity was observed. Viscosity strongly affects diffusion of the supporting electrolyte, suggesting that faster electrolyte transport into the RACs affects their electrochemical performance, although other effects brought by the wettability towards different solvents might still contribute to the observed differences. Acetonitrile allowed the fastest access to charge into the film, thus comparisons of charge transfer among different RAC sizes are more suitable in this solvent.

FIGS. 10A and 10B show cyclic voltammograms for each size of viologen-based RAC (RACs 1-3) in 0.1 M $LiBF_4$ in acetonitrile at different scan rates (a) 20 mV/s and (b) 5 mV/s, respectively. The concentration of viologen in RAC monolayers, assuming that their thickness was equal to the particle diameter, was estimated by integrating the charge under the curve of a voltammogram at a scan rate of 5 mV/s as shown in FIG. 10B. This estimation yielded 1.0 and 1.1 M for RACs 1 and 2 respectively. The value for RAC 2 appears reasonable given that SEM and cross-sectional SEM analysis of RAC 2 in FIGS. 2 and 7A indicate a similar packing density for all monolayers, and only small distortions in particle shape upon contact with the electrode. Furthermore, and despite the uncertainties due to swelling in electrolyte, these concentrations are close to the theoretically-estimated 2M based on the density of viologens (1.25 g/cm$^3$)[25] and volume of the RAC particle.

The shape of the CV and square-root scan rate dependence of RAC 1-3 films suggests a strong component of charge diffusion within the particles as shown in FIGS. 10A and 10B. Although RACs are immobilized on the surface, long-distance charge transfer from the electrode to the bulk particle film presents itself as a diffusive component. This phenomenon has been explained in terms of pendant-to-pendant charge hopping via the Dahms-Ruff relationship:

$$D=D_{phys}+D_{CT}=D_{phys}+(1/6)k_{ex}\delta^2 C^* \quad (1)$$

where D is the total diffusion coefficient for charge transfer, $D_{phys}$ is related to the physical transport of redox species to the electrode, $D_{CT}$ is the diffusive charge transport, $k_{ex}$ is the self-exchange rate constant for electron transfer between neighboring redox centers, δ is the distance between these redox centers, and C* is their bulk concentration of the redox species in the film. Because the particles are immobilized as a monolayer, $D_{phys}$ is assumed to be negligible, while diffusive charge transport, $D_{CT}$, dominates the transient response.

Although FIG. 10A evidenced a component of charge diffusion, the response was still within a regime where the current scaled with particle diameter. This suggested possible differences among the RAC sizes given that all other conditions (i.e. supporting electrolyte, solvent, and electrode area) were equal throughout. To explore these differences in diffusional transport, the RAC monolayer CVs were compared to simulations of a surface-confined film across the RAC sizes.

Plausible concentrations of redox-active units were used to compare the experimental CVs and calculate a range of values for charge transfer diffusion coefficients. Simulated CV curves indicate that $D_{CT}$ values for all RACs lie within $10^{-11}$-$10^{-12}$ cm$^2$/s when concentration (C*) is ≤2 M. Table 4 shows values of $D_{CT}$ of RACs 1-3 at varying concentrations. FIGS. 11A-C show graphical representations of Table 4 at dry RAC diameters, where the plots show experimental cyclic voltammograms at 20 mV/s compared to theoretical fits at four concentrations with corresponding $D_{CT}$ values shown in Table 4 for each (a) RAC 1, (b) RAC 2, and (c) RAC 3, respectively. An uncompensated resistance of about 1 kΩ was observed and used in simulations.

The parameters used for FIGS. 11A-C and Table 4 are described as follows. Theoretical estimations of RAC concentration were done based on the density of small molecule viologens (1.24 g/cm$^3$) and RAC spherical dimensions. These estimate approximately a 2 M concentration of viologen per RAC. For a close-packed film, the concentration of viologens would be slightly below due to packing of spheres. Thus, 2 M was chosen as an upper bound and 0.5 M as a lower bound. Simulations were performed on DigiElch 7FD software. Simulation parameters were set for a charge transfer step Ox+e$^-$→Red with $E_{1/2}$ of −0.68 V (RAC 1), −0.69 (RAC 2), −0.67 V (RAC 3), α=0.5, and k°=0.001 cm/s based on measured rate constants for viologen polymers[5]. Electrode geometry was set as planar 0.283 cm$^2$, equivalent to exposed monolayer area in experimental CV and thickness of layer was varied according to RAC diameters. Concentration profile was bound to film thickness, and 1000 ohms of resistance were applied. For each RAC size, the only constant varied was $D_{CT}$ at C* (initial concentration) of 2.0, 1.5, 1.0, 0.5 M.

TABLE 4

Values of $D_{CT}$ fitted for RACs 1-3 at varying concentrations.

| C* (M) | RAC 1 $D_{CT}$ (cm$^2$/s) | RAC 2 $D_{CT}$ (cm$^2$/s) | RAC 3 $D_{CT}$ (cm$^2$/s) |
|---|---|---|---|
| 2.0 | $1.0 \times 10^{-12}$ | $6 \times 10^{-12}$ | $2 \times 10^{-11}$ |
| 1.5 | $1.7 \times 10^{-12}$ | $1.2 \times 10^{-11}$ | $3.5 \times 10^{-11}$ |
| 1.0 | $4 \times 10^{-12}$ | $4 \times 10^{-11}$ | $8 \times 10^{-11}$ |
| 0.5 | Independent | Independent | $3.5 \times 10^{-10}$ |

From the SEM cross analysis, thickness was assumed to be that of the dry RAC diameter due to the confined packing on the electrode surface. For RACs 1-2, changes in $D_{CT}$ below 0.5 M do not give rise to a close fit regardless of the chosen value of $D_{CT}$. FIGS. 11A-C show plausible fits when assuming the film concentration of 1.0 M, close to the experimentally-obtained value. Thus, when considering monolayer RAC concentrations to range between 2.0-0.5 M, $D_{CT}$ values are at a similar scale to reported viologen polymeric systems at $10^{-11}$ cm$^2$/s. Interestingly, $D_{CT}$ also seemed to increase with RAC diameter, supporting that the observed trend in FIG. 10A is due to charge transfer differences between the films. FIG. 12D shows cyclic voltammograms for dry and swollen RAC 3. According to these results, larger RAC 3 with a $D_{CT}$ value of $8.0 \times 10^{-11}$ cm$^2$/s (for 1 M) exhibits improved charge transfer properties, possibly arising from higher surface area exposed to electrolyte.

FIG. 11D compares the experimental (solid line) cyclic voltammograms with simulated (dashed line) cyclic voltammographs using $D_{CT}=8.0 \times 10^{-11}$ cm$^2$/s at varying scan rates. An uncompensated resistance of about 1 kΩ was observed and used in simulations. FIG. 11D shows that the calculated $D_{CT}$ for RAC 3 is in reasonable agreement with CV at various scan rates. Possible discrepancies with the model may arise from the assumption of linear diffusion within the monolayer films.

SECM RAC Electrochemical Measurements.

To further explore the charge transfer properties of RACs at the nanoscale while minimizing IR drop effects, scanning electrochemical microscopy (SECM) experiments were performed. A glass substrate was prepared with a low loading of RAC 3. This substrate was then immersed into 0.1 M LiBF$_4$ in acetonitrile. A 300 nm radius SECM probe electrode was approached towards the glass substrate in an area that contained RAC 3, as shown in FIG. 13A. A successful approach to a single particle on the glass substrate gives negative feedback. FIG. 13B shows CVs at various scan rates on approached RAC. As shown in FIG. 13C, chronoamperometric transients from the discharges at −0.1 V vs. Ag/Ag$^+$ indicate starting current densities of 0.8 mA/cm$^2$. At the inset, chronocoulometric transients are taken at −0.89 V and −0.1 V vs. Ag/Ag$^+$ (0.1 M AgNO$_3$) reversibly. FIG. 13D shows an SEM of RAC 3-coated glass substrate post experiment.

Cyclic voltammetry exhibited two redox processes identified with the V$^{2+}$/V$^+$ and V$^+$/V redox couples, where V is a viologen unit. Chronoamperometry under potential control allowed us to perform a reversible particle electrolysis for the V$^{2+}$/V$^+$ redox pair using the small contact area for the SECM tip. The cathodic steps show differences in charge observed with respect to the anodic step, which are likely due to small traces of 02 in the cell. However, the fully reproducible anodic steps indicate that RACs can withstand current densities of 0.8 A/cm$^2$. The limiting charge observed in this experiment corresponded to 3.5 nC, leading to an estimated concentration of 25 M. When compared to theoretical values of 2 M per individual RAC, it is possible that the SECM electrode was addressing more than one RAC. Nonetheless, the electrolysis allowed for the observation of high current density capabilities at the nanoscale, as well as reversible charge and discharge.

Electrochemical Reactivity of Dispersed RACs 1-3.

To further probe the efficiency and rate of charge/discharge processes, dispersions of varying particle size (RACs 1-3) in 0.1 M LiBF$_4$ and acetonitrile were prepared. FIGS. 14A-C and FIGS. 15A-F show electrochemical properties of RACs 1-3. FIGS. 14A-C show dispersion-phase electrochemical properties of RACs 1-3. Their electrochemical properties were studied with CV under static conditions at an equivalent viologen concentration of 10 mM. FIGS. 15A and 15B show peak current—scan rate relationship of RAC 2 first redox in dispersion-diffusion-limiting and surface-confined contributions, respectively. FIG. 15C show cyclic voltammograms of RAC 2 used to obtain data points as shown in FIGS. 15A and 15B, respectively (10 mM RAC 2). FIGS. 15D-F show steady state voltammetry of neutral and reduced 15 mM RACs at sizes—(d) RAC 1 (80 nm) (e) RAC 2 (135 nm) and (f) RAC 3 (827 nm), respectively.

FIG. 14A shows cyclic voltammograms of RACs 1-3 on 0.03 cm$^2$ Pt disk electrode (v=75 mV/s, 10 mM). Studies using a macro disk electrode revealed quasi-Nernstian response with signatures that suggest chemical and electrochemical reversibility. The first redox process showed peak current ratios near unity centered at E$^0$=−0.7 V vs. Ag/Ag$^+$ (0.1 M AgNO$_3$), consistent with the voltammetry of the monomer unit (Nagarjuna et al., *J. Am. Chem. Soc.* 2014, 136, 16309.). Scan rate dependence analysis of the CV peak height did not conclusively show a strong correlation vs. v or v$^{1/2}$, suggesting that the CVs are neither described by pure diffusion-limited mass transfer nor that expected for a surface-confined electroactive film. It is likely that both processes occur simultaneously (Nagarjuna at al., *J. Am. Chem. Soc.* 2014, 136, 16309; Burgess et al., *J. Electrochem. Soc.* 2015, 163, H3006; Peerce et al., *J. Electroanal. Chem. Interfacial Electrochem.* 1980, 114, 89).

In RACs, a persistently adsorbed layer of redox material likely mediates electron transfer to the solution species through interparticle interactions. Likewise, it is expected that dispersed individual RACs exchange charge within the diffusion layer. While a full description of this complex interplay is beyond the scope of this study, it is convenient to decouple contributions from film and solution species. FIG. 14B shows microelectrode voltammetry of RAC 2 at neutral and charged state as compared to simulation with $D=4.8\times10^{-7}$ cm$^2$/s, $E^0=-0.73$ V, $k^0=0.015$ cm/s, $\alpha=0.5$. Microelectrode radius was 12.5 µm, and the concentration of redox species was 15 mM. FIG. 14C shows the charge/discharge performance of RAC 2 bulk electrolysis on SGL GFA6 carbon electrode. Theoretical capacity is 134 mAh/L (5 mM). Inset of FIG. 14C: Visual changes are observed from neutral (top, SOC: 0) to charged state (bottom, SOC: 1).

FIGS. 16A-16F show electrochemical adsorption properties of RACs 1-3. FIG. 16A shows cyclic voltammogram of adsorbed RAC 2 at several scan rates. FIG. 16B shows comparison of RAC 2 voltammetry in dispersion and resulting film in blank supporting electrolyte on 0.03 cm$^2$ Pt disk electrode (v=100 mV/s). FIG. 16C shows a CV of RAC 2 through the first reduction. FIG. 16 D shows peak current—scan rate relationship of RAC 2. First reduction peak currents extracted from FIG. 16C and fitted. FIGS. 16E and 16F show CVs of RACs through the first reduction for (e) RAC 1 and (f) RAC 3, respectively.

The film contribution to the voltammetric signal was studied by performing CV on an electrode previously run in RAC dispersion. Once voltammetry was done in dispersion, the working electrode was thoroughly rinsed, dried and placed in a blank electrolyte solution. The viologen RAC emerged film was electroactive and did not appear to impede the charge transfer to RACs within the potential of the first redox process when tested in blank electrolyte, confirming the formation of an adsorbed layer and its mediation of electron transfer. We did find, however, that excursions to potentials where the second electron process occurs, results in electrode fouling (Nagarjuna et al., *J. Am. Chem. Soc.* 2014, 136, 16309.). We therefore focused solely on the first electron transfer. Importantly, we found that each of the viologen RAC dispersions were redox-active and, at equivalent pendant concentration, they displayed voltammetric signatures within the same order of magnitude in current intensities independent of their particle size as shown in FIG. 14A.

Figure 17:
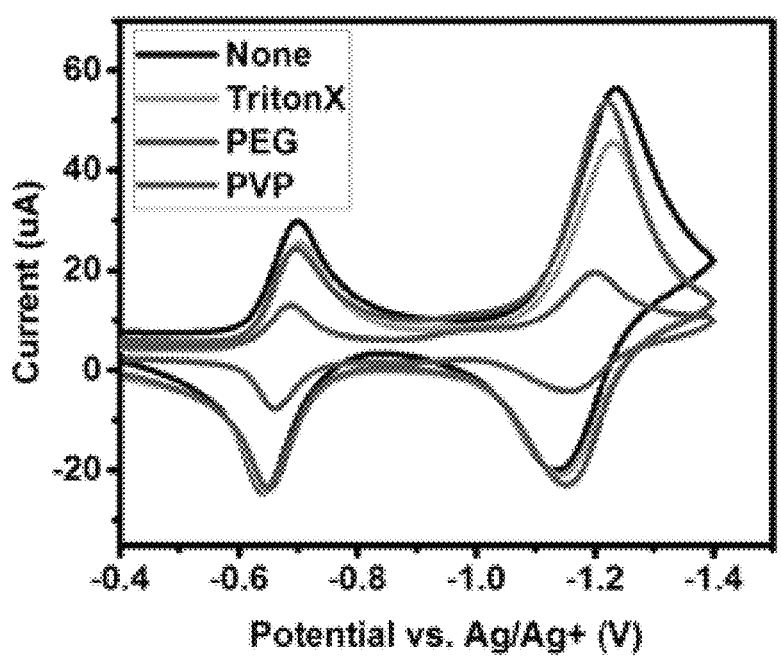
FIG. 17 shows CV spectra of RAC 1 using different stabilizing agents.

The only difference we did observe between particle sizes is that RAC 3 consistently exhibited lower current levels than RACs 1-2. We ascribe this suppression in current levels to the stabilizer used for RAC 3. This stabilizer may affect the arrangement of RACs on the electrode surface, in turn affecting the current response in multi-layer films. FIG. 17 shows CVs of RAC 1 using different stabilizing agents. All scans were measured using 10 mM RAC 1, 0.1 M LiBF$_4$ in acetonitrile (v=75 mV/s).

TABLE 5

Calculated diffusion coefficients for RAC 1 with varying stabilizer.

| Stabilizer | Steady State Current ($\times 10^{-9}$ A)$^a$ | D (cm$^2$/s) |
|---|---|---|
| Triton X | 1.2 | $1.7 \times 10^{-7}$ |
| None | 0.3 | $4.1 \times 10^{-8}$ |
| PEG | 1.0 | $1.4 \times 10^{-7}$ |
| PVP | 0.3 | $4.1 \times 10^{-8}$ |

$^a$From chronoamperometric step taken at −0.85 V vs. Ag/Ag$^+$ (0.1 M AgNO$_3$) on a 12.5 µm Pt UME.

Microelectrode cyclic voltammetry (ME CV) displayed a steady-state profile resulting from reaction and physical transport of RACs to the electrode surface as shown in FIG. 14B. The microelectrode response showed signatures from both adsorption (as a pre-peak) and expected radial diffusion (Bard, A. J.; Faulkner, L. R., *Electrochemical Methods: Fundamentals and Applications.* 2nd ed.; Wiley: 2000.). The wave shape from the ME CV measurements was compared to theoretical fits of Nernstian reactions to shed light on kinetic complications that could be expected on solution species showing similar wave slopes. The model fit is only taken as an approximation since it does not account for adsorption, mediation of the adsorbed film to solution species, or inter-particle charge exchange in the solution phase. However, comparison to a continuum model of CV provides a suitable baseline for contrasting the behavior of RACs to that of small molecules. Nevertheless, fitting of ME CVs to theory showed that electron transfer to the solution species, although not yielding a fully Nernstian response, is fast with an estimated comparable standard electrochemical rate constant $k^0=0.015$ cm/s.

We assumed chemical reversibility, as observed in macrodisk CV and a transfer coefficient $\alpha$ of 0.5. Broadening of the ME CV wave and the incipient second viologen reduction wave causes the observation of only a narrow steady state plateau. The fitting of this wave helped in obtaining transport parameters. The apparent diffusion coefficient, D, obtained from steady-state ME CV was calculated using the steady state current, expressed as $i_{ss}=4nFaDC^*$, where n is assumed to be 1, F is Faraday's constant, a is the radius of the electrode equal to 12.5 µm, and C* is the bulk equivalent concentration of pendants in the RAC. Apparent values of D were found to be $1.7\times10^{-7}$ cm$^2$/s, $4.8\times10^{-7}$ cm$^2$/s, and $1.8\times10^{-7}$ cm$^2$/s for RACs 1-3 respectively. We notice, however, that small differences in D between RACs 1-3 do not scale as expected from the Einstein-Stokes relationship, implying that D possibly reflects other contributions in charge transport, including that from $D_{CT}$ (Paulson et al., *Anal. Chem.* 1996, 68, 581.).

This observation is not unreasonable considering their size; for example, in the case of RAC 3 its swollen diameter is 5% of the microelectrode diameter. For comparison, dynamic light scattering (DLS) experiments showed D values of $7.38\times10^{-8}$ cm$^2$/s, $5.46\times10^{-8}$ cm$^2$/s, $0.927\times10^{-8}$ cm$^2$/s for RACs 1-3 respectively, where consistently the electrochemical estimate was higher than that of DLS. An interesting manifestation of the impact of RAC interactions with electrodes was that CV experiments in dispersion showed lower currents than those observed on emerged RAC films on such electrodes.

To explore this voltammetric response, increasing amounts of RAC 2 were loaded onto a Pt disk electrode by dropcasting and a chronoamperometric step was applied to measure the film's charge. As the RAC loading increased, the charge followed up to a saturation point, wherein afterwards the measured current and charge decreased. This behavior is possibly due to insufficient diffusion of supporting electrolyte to the electrode surface. These results suggest that when in dispersion, RACs form a compact multi-layer arrangement on the electrode surface that decreases slightly the current. FIGS. 18A-18C show the effect of film loading on electrochemical properties for RAC 1, RAC 2, and RAC 3, respectively. Change in RAC charge is plotted as a function of the loading onto an electrode surface. 10 mM RAC in acetonitrile (no supporting electrolyte) was deposited dropwise onto a 0.03 cm$^2$ Pt disk electrode in 10 uL increments and let dry. The charge due to the adhered film was measured by chronoamperometry (potential held at −0.9 V vs. Ag/Ag$^+$ for 300 s) in a 0.1 M LiBF$_4$ acetonitrile solution.

Bulk Charge Storage Properties of RACs.

Despite their large size, dispersed RACs collect and store charge efficiently from a stationary electrode in bulk dispersions. To explore the charge storage capacity and stability of viologen-RACs, inert-atmosphere, potential-controlled bulk electrolysis (BE) and ME CV were performed on all the particle sizes to a state of charge (SOC) of unity. Mirroring the experiments with a single RAC particle, BE unambiguously demonstrated that charge injection during electrolysis occurred efficiently on the solution species. FIGS. 14B and 14C show the BE and steady state voltammetry of RAC 2. These particles showed the most reversible cycling and displayed access to 91±3% of the theoretically-accessible groups over fifty full cycles with a Coulombic efficiency of 99±1% (see FIG. 14C and FIGS. 18A-18C). ME CV confirmed chemically-reversible transformation from V$^{2+}$ to V$^{·+}$ as shown in FIG. 14B for RAC 2 after the full electrolysis.

Figure 19A:
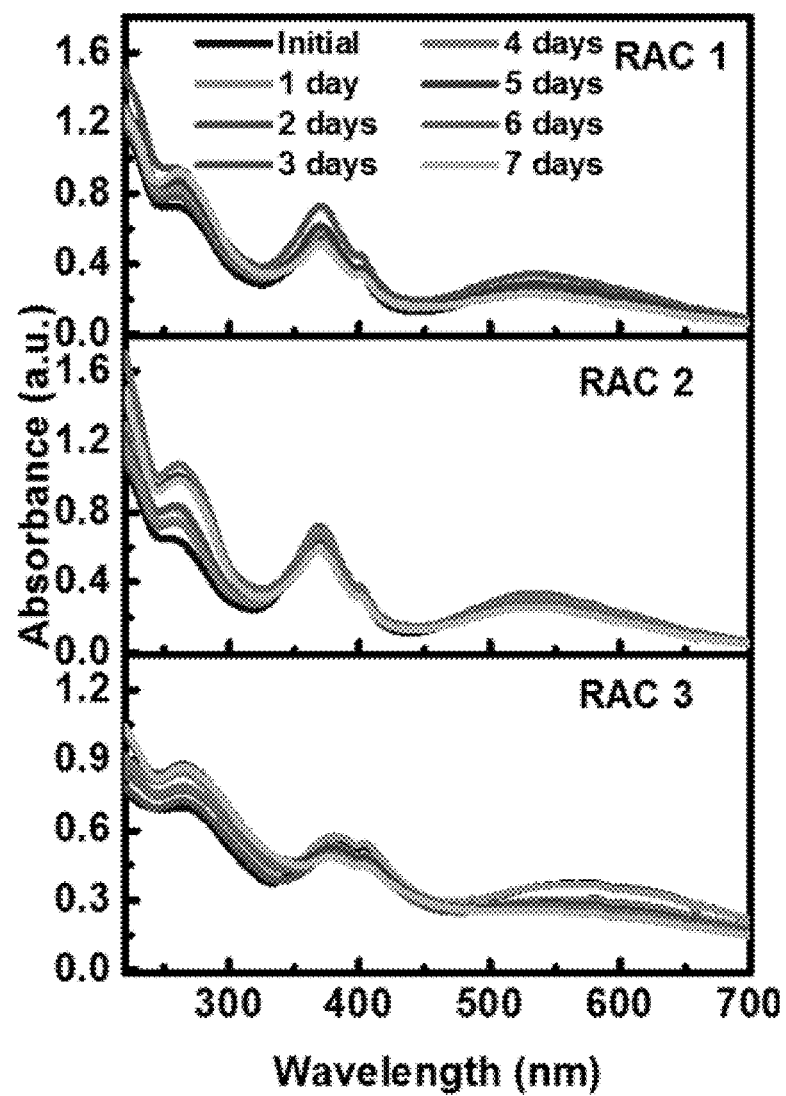
FIG. 19A-B show the stability of first reduced state in RACs 1-3 as studied by UV-vis absorption spectra. RAC 1, 80 nm; RAC 2, 135 nm; RAC 3, 827 nm. (A) Absorbance spectra of RACs at 50 µM RAC in 0.5 mM LiBF4 in acetonitrile. (B) Time dependent absorbance (normalized to the initial value) of the reduced RACs at 370 nm shows stability in state of charge over time.
Figure 19B:
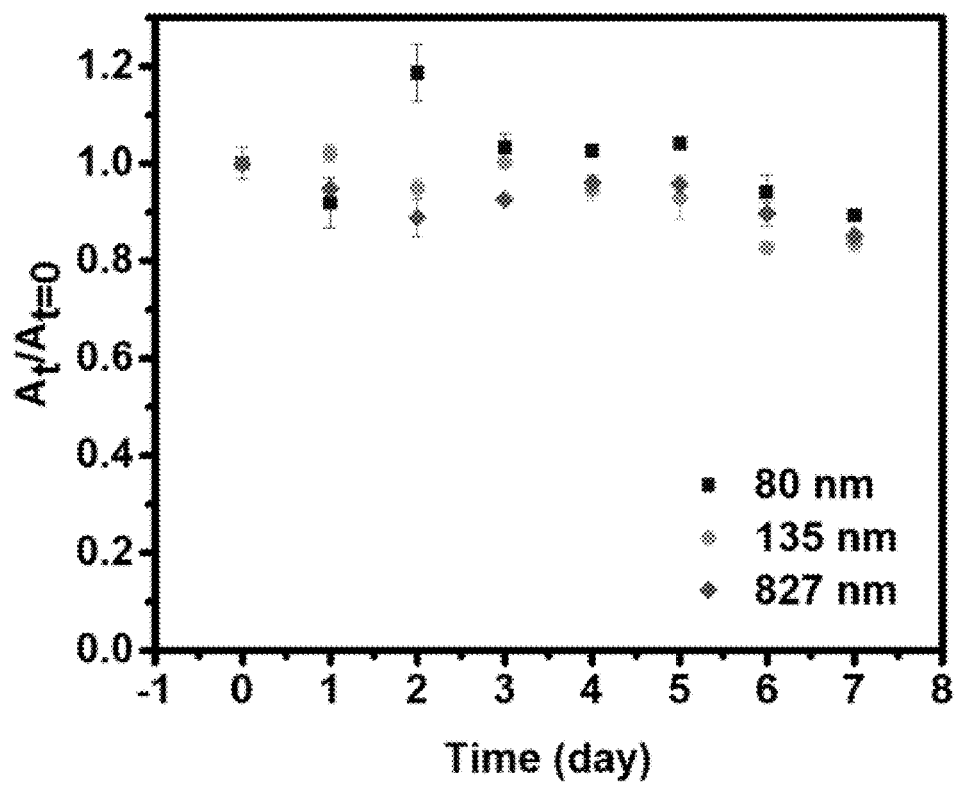

To further support dispersion-phase studies, the structural and chemical stability of RACs in the charged state (V$^{·+}$, SOC: 1) and after multiple charge/discharge cycles (V$^{2+}$, SOC: 0) were studied using UV-vis, dynamic light scattering (DLS), and ex-situ SEM. Full reduction of RACs 1-3 was achieved by BE at an overpotential of −150 mV. FIGS. 21A-C show stability of first reduced state in RACs 1-3 as studied by UV-vis absorption spectra. Absorbance spectra of RACs at 50 M RAC in 0.5 mM LiBF$_4$ in acetonitrile shows stability in state of charge over time (FIG. 19A). As shown in FIGS. 21A-C, UV-vis absorbance spectra show distinct peaks for the reduced state of viologen RACs at the 370 and 540 nm regions as opposed to the neutral state, which absorbs at about 260 nm. Comparison to initial absorbance values remained near unity with less than 9% deviation over the seven days. This means that the reduced state in RACs 1-3 was stable for at least 7 days with only a minor decrease of less than 9% in absorbance over this time (see FIGS. 19B and 20A-D). We ascribe this decrease to interactions with small levels of scavenging species such as adventitious 02. FIG. 19 shows the time dependent stability of RAC reduced state. UV-vis absorbance at 370 nm was normalized to the initial value over time of the reduced RACs to quantify chemical stability of their reduced state. FIGS. 20A-D shows charge storage in RACs 1-3. FIG. 20A shows selected charge/discharge curves for RAC 2 (135 nm) bulk electrolysis on C felt electrode at 5 mM RAC in 5 mL of 0.1 M LiBF$_4$. FIGS. 20B-D shows charge/discharge curves for bulk electrolysis of RACs 1-3 on Pt mesh electrodes at 15 mM RAC in 5 mL 0.1 M LiBF$_4$ in acetonitrile. FIG. 20B shows RAC 1, which obtained 68% average cycle efficiency. FIG. 20C shows RAC 2, which obtained 90% average cycle efficiency. FIG. 20D shows RAC 3, which obtained 78% average cycle efficiency. Positive charge denotes reduction (charging) and negative charge is for oxidation (discharging).

The structural stability of the RACs was determined by characterizing the size of the particles after a charging step. As shown in Table 3.1, DLS analysis shows that the size of the charged RACs increased by approximately 20 nm as compared to their original state, although the increment was within the standard deviation of the measurements. As shown in Table 6 and FIGS. 21A-D, SEM and DLS analysis of RACs after multiple charge/discharge BE cycles indicate that the size and shape of the particles is maintained. FIGS. 21A-C show SEM images of RACs 1-3, respectively, after multiple charge/discharge cycles. FIG. 21D shows RAC 2 adsorbed onto carbon felt electrode after 50 cycles.

Size Exclusion of RACs in Porous Separators.

Given the excellent prospects for the use of RACs as storage media, we explored them as "zero" crossover nanomaterials for size-exclusion flow batteries. The use of RACs in combination with a nanoporous separator dramatically decreased crossover. Table 6 shows the crossover studies in side-bi-side cell for different particles. All three RACs 1-3 at an equivalent viologen concentration of 10 mM showed negligible crossover within the limit of detection across both Celgard 2325 (pore diameter 28 nm) and Celgard 2400 (pore diameter 43 nm). In great contrast, LiBF$_4$, the supporting electrolyte used in our experiments, freely crossed the separator. Compared to our previous study on redox active polymers, this a great improvement in material rejection across Celgard 2325. In that case, the largest polymer was rejected 86% while RACs are rejected by >99%.

TABLE 6

Percent Crossover in Side-Bi-Side Cell for Different Particles.

| | Percent Crossover (%) | |
|---|---|---|
| Sample | Celgard 2400 (pore size: 43 nm) | Celgard 2325 (pore size: 28 nm) |
| LiBF$_4$ | 100 | 100 |
| Monomer | 95 | 97 |
| RAP | 14 | 7 |
| RAC 1 | 0.07 ± 0.01 | 0.07 ± 0.01 |
| RAC 2 | 0.04 ± 0.01 | 0.04 ± 0.01 |
| RAC 3 | 0.05 ± 0.01 | 0.05 ± 0.01 |

Additionally, size-dependent rheological studies of RAC dispersions in electrolyte media revealed that larger RAC sizes show exciting prospects for maximizing the energy density of the electrolyte while keeping the viscosity low enough for reliable flow operation even at high concentrations up to 40 wt % (Desmond et al., *Phys. Rev. E* 2014, 90; Wei et al., *Adv. Energy Mater.* 2015, 5; Smith et al., *J. Electrochem. Soc.* 2014, 161, A486; and Saunders, F. L., *J. Colloid Sci.* 1961, 16, 13). As expected, dispersions composed of smaller sized RACs exhibited higher viscosity than ones of larger sized RACs at identical concentrations. Thus, larger RACs display better prospects for flow while increasing size-selectivity.

Figure 22A:
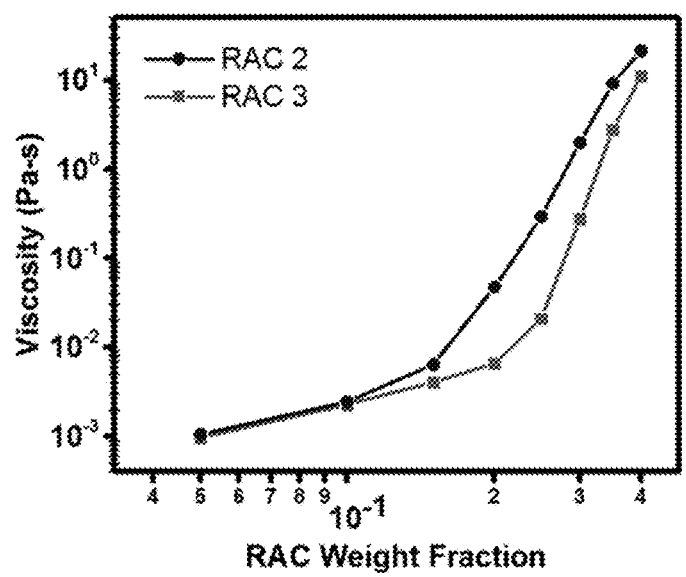
FIGS. 22A-F shows the rheological properties of RACs.
Figure 22B:
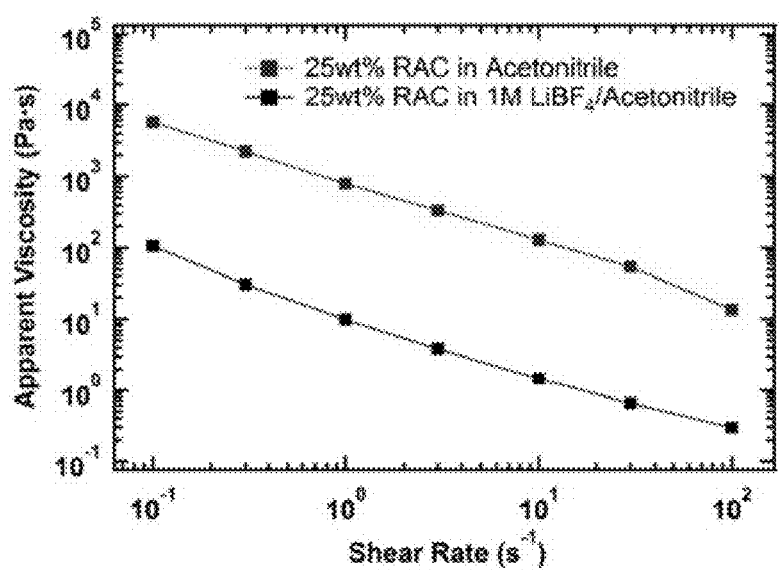
Figure 22C:
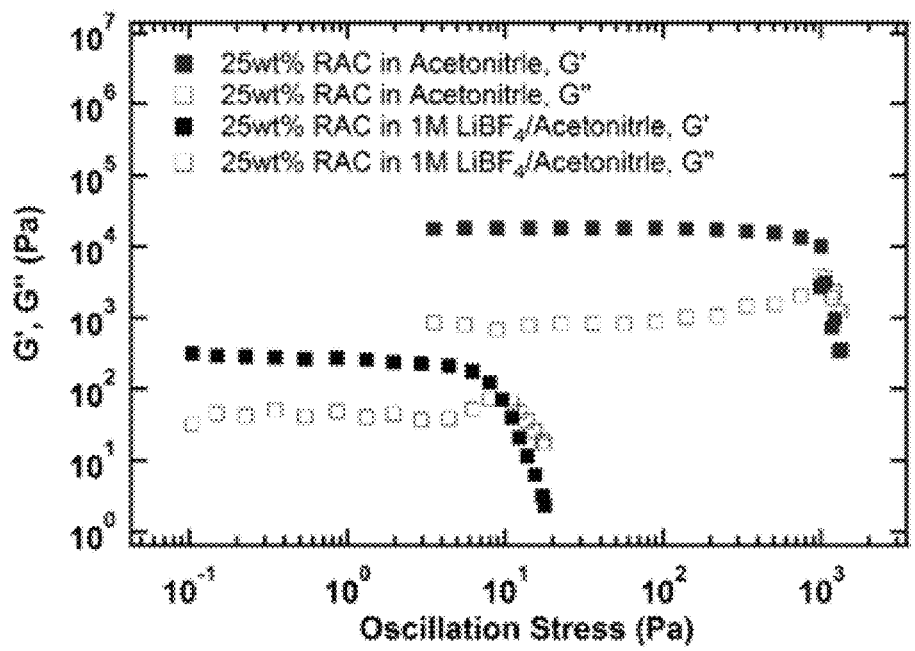
Figure 22D:
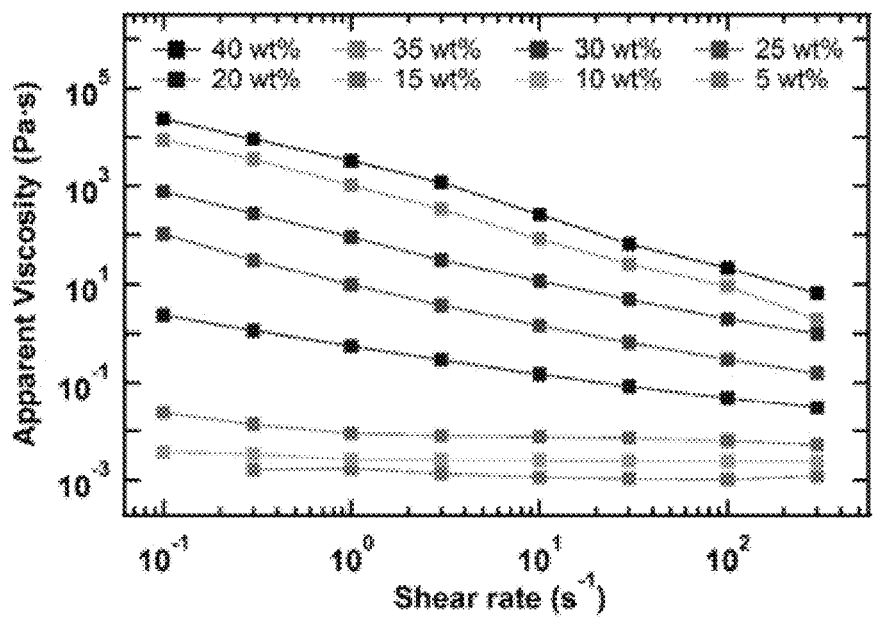
Figure 22E:
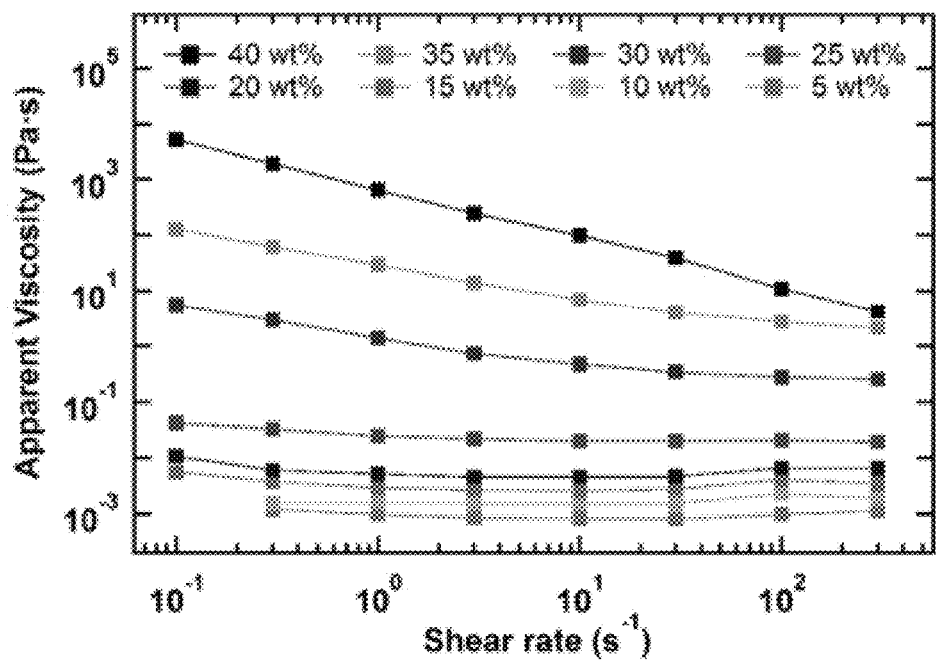
Figure 22F:
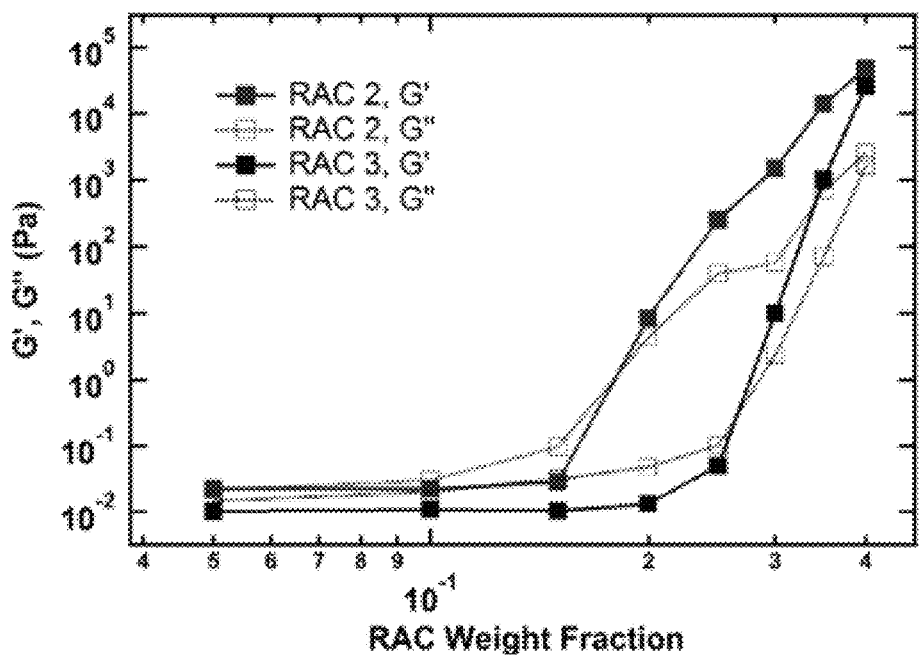

FIGS. 22A-F shows the rheological properties of RACs. FIG. 22A shows apparent viscosity measured at 100 s$^{-1}$ of viologen dispersions of varying particle size and weight fraction in acetonitrile with 1 M LiBF$_4$. FIG. 22B shows viscometry results at identical concentration, viologen RAC 2 dispersions (25 wt %) in the presence of high ionic strength (1 M LiBF$_4$, acetonitrile) exhibiting lowered viscosity across three orders of magnitude of shear rates (10$^{-1}$ to $10^{-2}$ $s^{-1}$). This suggests that the RACs de-swell at higher ionic strengths, leading to lowered occupied volume, or effective volume, manifesting as lowered viscosity. FIG. 22C show oscillatory results-lowered elastic modulus (G') for the RAC 2 suspension in high ionic strength, indicating a softened state. The 2-orders of magnitude drop in yield stress shown through the transition from the solid-like state (G' plateau) to the liquid-like state (G' drop) echoes with the viscosity drop as shown in FIG. 22B. FIGS. 22D and 22E show steady-state flow viscometry measurements from 5 wt % (0.11M) to 40 wt % (0.88M) in 1 M $LiBF_4$, acetonitrile for both (d) RAC 2 and (e) RAC 3, respectively. Results for suspensions of both RAC sizes show transition from Newtonian-like behavior to shear-thinning with the increase in concentration. This transition near 15 wt % and 25 wt % for RAC 2 and RAC 3, respectively, highlight the gel point, a transition from a fluid-like (G'<G") to a gel-like (G'>G") state. FIG. 22F shows elastic and storage moduli as a function of RAC concentration for various RAC blending ratios. The change in slope of G' vs RAC concentration emphasizes the gel point.

Prototype NRFB Explorations.

Because crossover and rheological experiments showed encouraging results, prototype size-exclusion NRFB experiments were conducted as a proof of concept. To demonstrate the facility of RAC modular synthesis, we functionalized xPVBC particles with a ferrocene monomer to generate catholyte RAC 4 particles (see Table 1.2). SEM showed RAC 4 to be 88±11 nm in dry diameter.

Electrochemical characterization of RAC 4 demonstrated reversible activity (FIG. 23). FIGS. 23A-D show the electrochemical properties of RAC 4. FIG. 23A show cyclic voltammograms of RAC 4 on 0.03 $cm^2$ Pt disk electrode at several scan rates (10 mM RAC in 0.1 M $LiBF_4$ MeCN). FIG. 23B show scan-rate dependence analysis of RAC 4 dispersion. FIG. 23C show charge/discharge curves for bulk electrolysis of RAC 4 on Pt mesh electrode at 10 mM RAC in 5 mL 0.1 M $LiBF_4$ in acetonitrile. Negative charge is for oxidation (charging) and positive charge denotes reduction (discharging). FIG. 23D shows a summary of the performance of RAC 4 bulk electrolysis. Theoretical capacity is 40 mAh/g or 234 mAh/L.

Figure 24A:
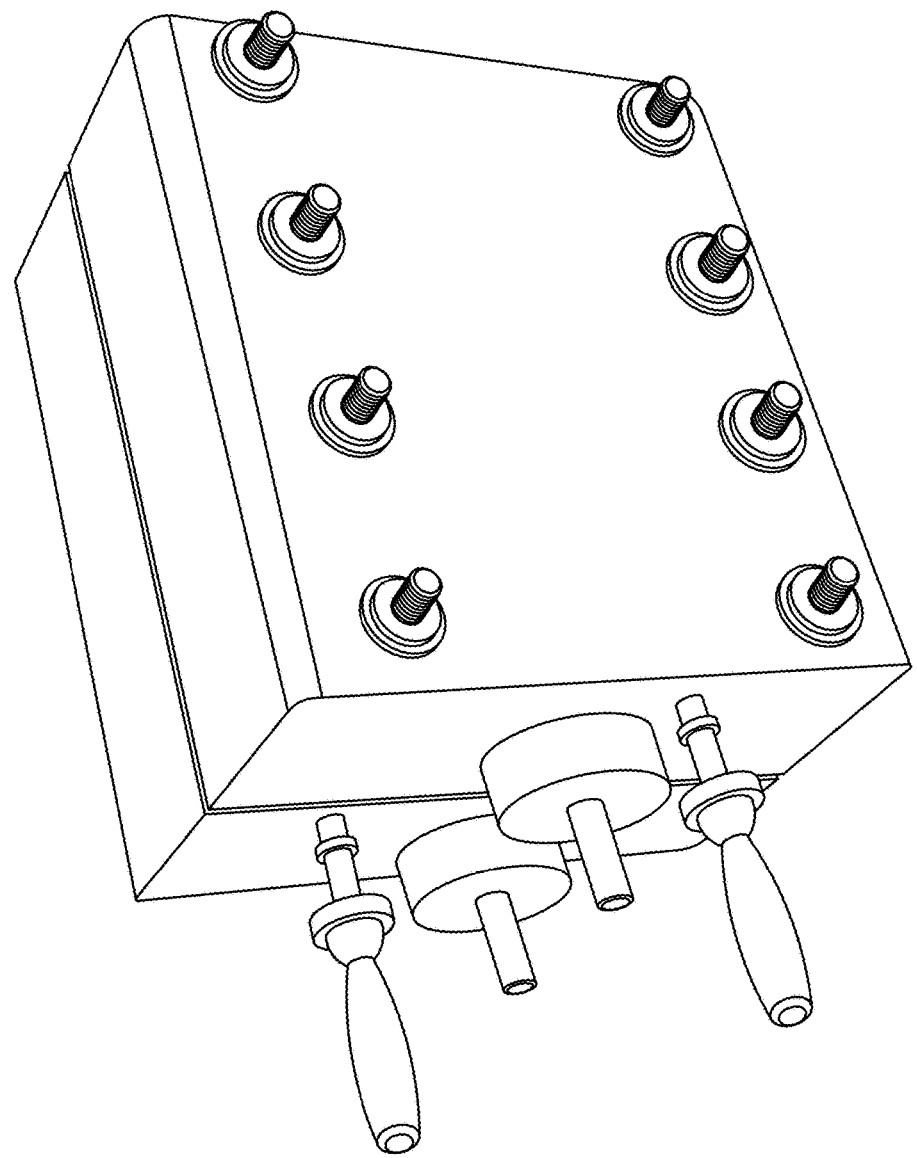
FIGS. 24A-G. Performance of RAC 2 and RAC 4 in flow cell.
Figure 24B:
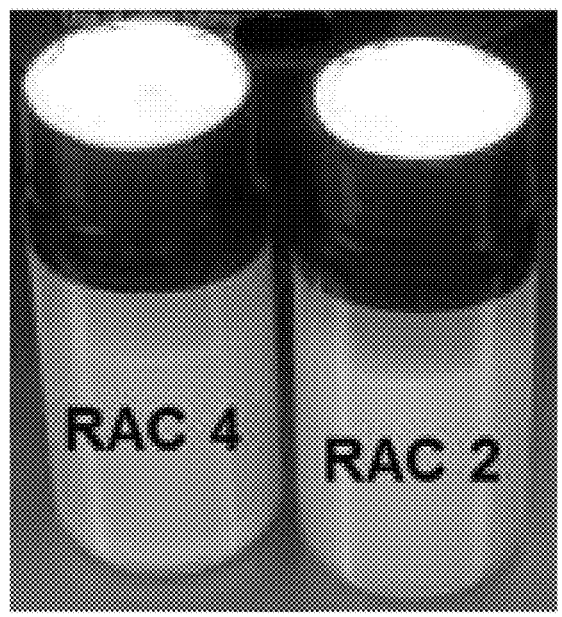
Figure 24C:
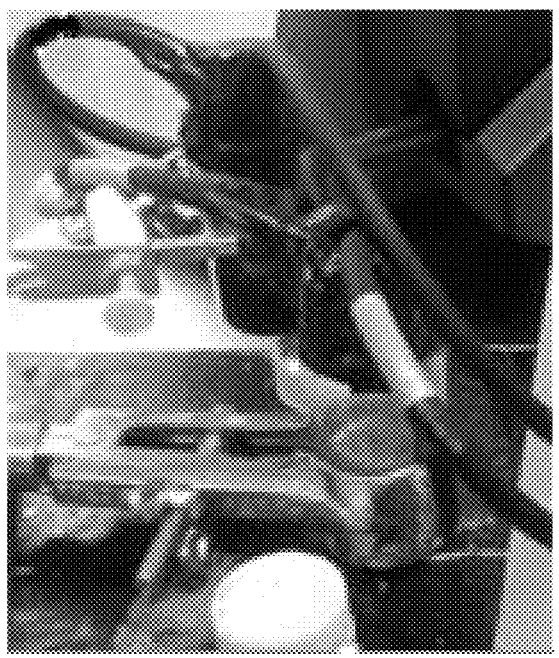

A prototype flow cell was assembled using RACs of similar diameters, RACs 2 and 4, as the redox active species in the anolyte and catholyte compartments, respectively. An example of a prototype flow cell is shown in FIG. 24A. Prototype Gen. 1 Cell used in flow cell testing. Stainless steel blocks with a flow-through channel on the inside serve as current collectors. Compartments are separated by PTFE gaskets that compress one sheet of Celgard 2325 porous separator. SGL GFA6 carbon felt was used inside both compartments as active electrode material (active area of electrode: 4.63 $cm^2$). Each reservoir was filled with 15 mL of 10 mM RAC in 0.1 M $LiBF_4$ in acetonitrile. The flow rate used was 5 mL/min on a MasterFlex L/S Digital Drive (HV-07522-30). Low concentrations (10 mM, 0.74 wt %) were used to test the initial concept if an all-RAC flow cell is a viable concept for RAC energy storage applications. Taking into account the low concentration, low current densities were chosen as to prevent polarization losses. FIG. 24B show dispersions of RAC 2 and 4 prior to flow cell assembly. RAC 4 solution shows some material settling, a possible limiting factor for depth of discharge which was found to be at a constant 21±0.5% for the 11 cycles done. FIG. 24C show dispersions flowing during experiment show change in state of charge. Rear vial is RAC 2, which becomes dark violet when charged. Front vial is RAC 4 which turns green when charged.

Figure 24D:
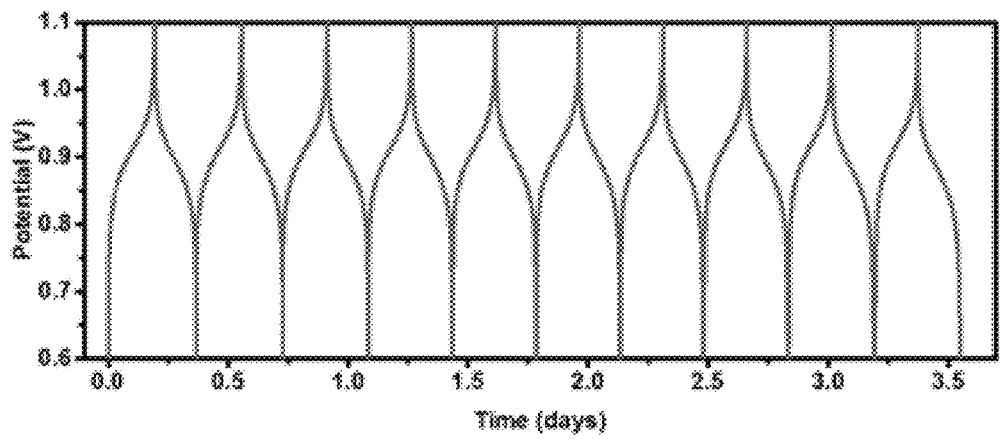
Figure 24E:
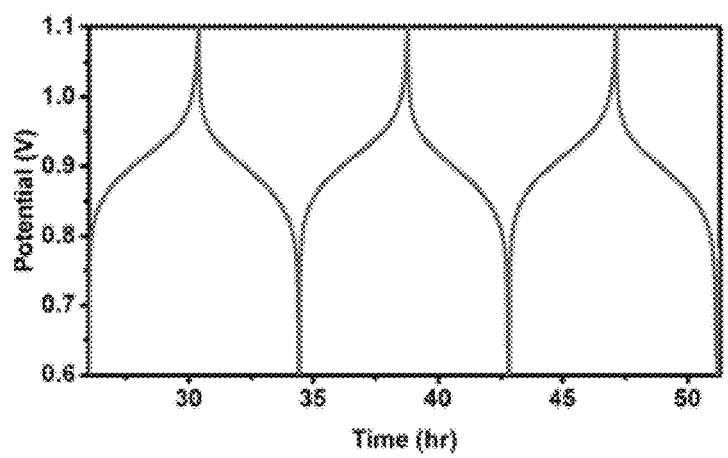
Figure 24F:
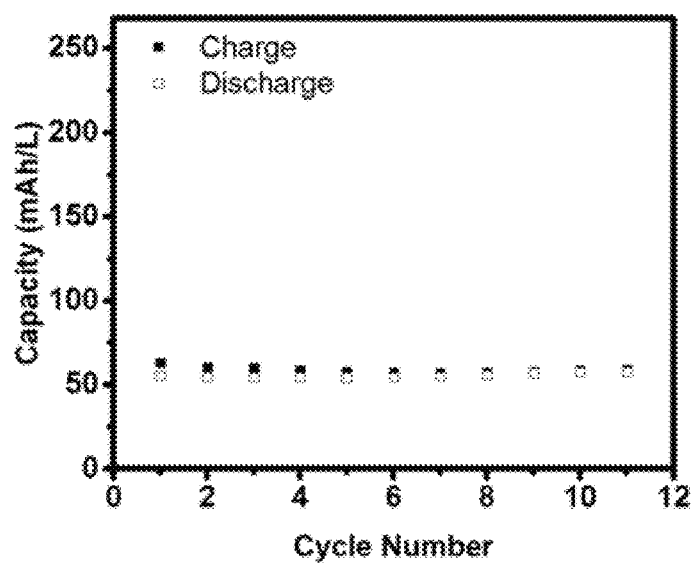
Figure 24G:
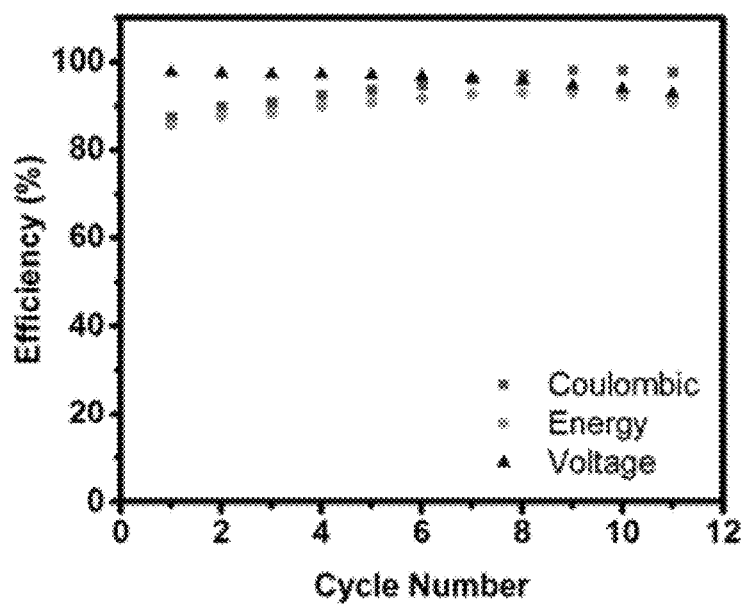

FIGS. 24D-G show the performance of RACs 2 and 4 as a flow cell active material. FIG. 24D shows a RAC 2/RAC 4 flow battery cell charge/discharge profile over time cycling at C/20 (43 iA/$cm^2$) and linear flow of 5 mL/min (10 mM, 15 mL in 0.1 M $LiBF_4$ in acetonitrile). FIG. 24E shows selected charge/discharge profiles from constant current cycling at 43 μA/$cm^2$ shows high symmetry of system. FIG. 24F shows that stable capacity is demonstrated from repeated charging/discharging at 43 μA/$cm^2$. The reversibility of this low concentration NRFB demonstrates that an all-RAC system is a conceivable concept that will require optimization. FIG. 24G shows RAC 2/RAC 4 flow battery cell response in terms of efficiency for 11 cycles of galvanostatic cycling.

The operating cell revealed high reversibility with an average coulombic efficiency of 94±4% over 11 cycles at C/20 (43 μA/$cm^2$) and volumetric flow of 5 mL/min. Electrochemical performance of the cell was tracked by energy and voltage efficiencies, which were highly stable and above 90%. When compared to recent studies of NRFB materials, this prototype shows higher efficiency metrics than some organometallic complexes, organic small molecules, and macromolecular designs such as polymers (Winsberg et al., *Chem. Mater.* 2016, 28, 3401; Xing et al., *J. Power Sources* 2015, 293, 778; and Wei et al., *Angew. Chem. hit. Ed.* 2015, 54, 8684).

Additionally, RACs offer the advantage of negligible crossover. Flow cell testing for over 3.5 consecutive days highlights the robustness and stability displayed by these particles. Capacity retention remained stable at 55±1 mAh/L over the 11 cycles. Nevertheless, it should be noted that capacity access was low at 21% of theoretical capacity (268 mAh/L at 10 mM). This low accessibility is likely from a combination of low loading and observed sedimentation from RAC 4. This is the first example of an all RAC NRFB, thus optimization will be required to fully make use of the billions of redox active units within RACs, but this prototype demonstrates a possible application for RACs as size-exclusion materials.

Conclusions. In summary, we have synthesized and characterized the electrochemical performance of redox active colloids. These stable, well-dispersed energy storage systems are composed of sub-micron particles that exhibit near-zero crossover. As demonstrated, RACs can be implemented in size-selective energy applications in the form of individual particles, monolayer films, and bulk dispersions. Their combination of surface-confined and diffusion-limited behavior gives rise to efficient charge transport in solution in each of these motifs. Their performance in a simple flow battery cell was also investigated. The observed coulombic, energy and voltage efficiencies revealed that RACs can cycle reversibly in this configuration. Due to the modular nature of RAC synthesis, this paradigm can be expanded to explore diverse families of anolyte and catholyte pendant moieties. Because they are new materials, significant rheological, electrode and design improvements are emerging from our laboratories to maximize their potential. Given their broad versatility, RACs offer considerable promise for emerging applications in energy storage whether it be as individual particles, adsorbed films or in dispersion-phase.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Abbreviations: RAC, redox active colloidal particle; UME, ultra-micro electrode; CV, cyclic voltammetry; BE, Bulk Electrolysis; COTS, commercial off-the-shelf; NRFB, non-aqueous redox flow battery.

Air or moisture-sensitive manipulations were performed under nitrogen atmosphere using standard Schlenk techniques. Glassware was oven-dried prior to use. Unless otherwise stated, starting materials and reagents were purchased from Sigma-Aldrich, Fisher Scientific or Matrix Scientific and used without further purification. Dimethyl formamide (DMF) and tetrahydrofuran (THF) were obtained from a Solvent Delivery System (SDS) equipped with activated neutral alumina columns under argon. Spectroscopic grade acetonitrile was used for UV-Vis, DLS, rheological, and electrochemical measurements. Infrared spectra (percent transmittance) were acquired on a Nicolet Nexus 670 FT-IR spectrometer with an ATR-IR attachment. UV-Vis absorption spectra were recorded on an HP8542 and Shimadzu instruments. Dynamic light scattering was recorded on Malvern Zetasizer. Refractive index and viscosity of acetonitrile were used as input parameters for DLS measurements. Elemental analyses were performed on the following instruments: CHN analysis—Exeter Analytical CE 440 and Perkin Elmer 2440, Series II; ICP analysis—ICP-MS and ICP-OES; Halide analysis—Titration & ISE. Viscosity was measured on a TA Instrument AR-2000EX rheometer.

Rheology was performed at 22° C. on a TA Instrument AR-2000EX rheometer using smooth surface finish stainless steel parallel plates (40 mm diameter) with a 500 µm gap height. Measurements of elastic and storage moduli were done at 10 rad/s.

Crossover studies were done using a PermGear Side-Bi-Side cell and UV-Vis absorbance. All dispersion characterization measurements were done in acetonitrile and concentrations are defined as moles of redox active unit per liter.

Example 1. Preparation of Polyvinylbenzyl Chloride Particles

Redox-active colloidal particles were prepared and evaluated as redox species for non-aqueous redox flow batteries (NRFBs). A schematic of the colloidal particles prepared from a polyvinylbenzyl chloride latex is shown in FIG. 1.

Polyvinylbenzyl Chloride Particles (60 nm and 90 nm).

The redox-initiated emulsion polymerization of 4-vinylbenzyl chloride reported by Chonde and coworkers (*J. Appl. Polym. Sci.* 1980, 25, 2407) was modified to synthesize poly(4-vinylbenzyl chloride) (PVBC) particles 60±10 and 90±10 nm in diameter. Reagent quantities are listed in Table 1-1.

TABLE 1-1

Recipes for 60-nm and 90-nm PCMS particles.

| Reagent | 60-nm Recipe | 90-nm Recipe |
| --- | --- | --- |
| Water (mL) | 21.0 | 14.0 |
| 10% (w/w) Triton X-100 (mL) | 16.0 | 16.0 |
| 1.0% (w/w) Sodium dodecyl sulfate (mL) | 16.0 | 16.0 |
| 0.1 N KOH (mL) | 12.0 | 12.0 |
| 0.01% (w/w) FeSO$_4$•7H$_2$O (mL) | 1.0 | 2.0 |
| 4-Vinylbenzyl chloride, 90% (mL) | 15.0 | 30.0 |
| Divinylbenzene, 80% (mL) | 0.30 | 0.60 |
| 1.0% (w/w) NaHSO$_3$ (mL) | 4.0 | 8.0 |
| 3.0% (w/w) K$_2$S$_2$O$_8$ (mL) | 2.0 | 4.0 |
| Nitromethane (mL) | 0.02 | 0.02 |

Larger or smaller particles can be prepared based on proportional variations of these components and quantities.

A 200-mL Morton flask fitted to a mechanical stirrer was charged with water, Triton X-100 solution, SDS solution, and KOH solution. Nitrogen was bubbled through the mixture for 15 min, and the mixture was heated to 30° C. After addition of 4-vinylbenzyl chloride and divinylbenzene, the mixture was stirred ~330 rpm for 1 h. The initiator solutions and nitromethane were then added, and the stir rate was reduced to ~150 rpm. Turbidity was observed within 15 min. After 12 h, the reaction mixture was dialyzed against a 2.0% (w/v) solution of Triton X-100 in THF. The solution was replaced 4 times in 24 h. Particle diameter and standard deviation were obtained from SEM images using ImageJ software and averaging 50 particles.

Polyvinylbenzyl Chloride Particles (750 nm):

The dispersion polymerization procedure reported by Margel and coworkers (*J. Poly. Sci. Part A* 1991, 29, 347) was modified to yield PVBC particles 0.75±0.08 µm in diameter. In a 200-mL Morton flask fitted to a mechanical stirrer, polyvinylpyrrolidone (1.15 g, average molecular weight 40 kDa) was dissolved in 200-proof EtOH (95 mL). The solution was stirred at ~165 rpm and sparged with nitrogen for 15 min before being heated to 70° C. AIBN (0.10 g) was dissolved in 4-vinylbenzyl chloride (4.9 mL, 90%) and divinylbenzene (0.10 mL, 80%); this solution was added to the stirring, heated mixture. After 12 h, the mixture was centrifuged; and the supernatant was decanted. The particles were functionalized in the next step without purification or drying. Particle diameter and standard deviation were obtained from SEM images using ImageJ software and averaging 50 particles.

Example 2. Preparation of Viologen Redox-Active Colloidal Particles (RACs 1-3)

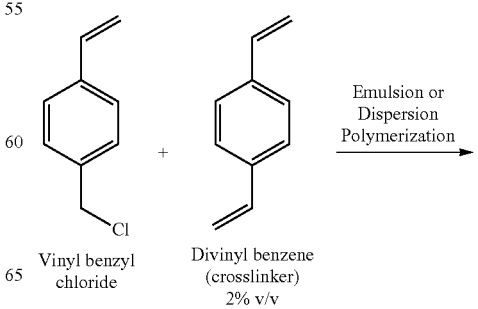

Vinyl benzyl chloride + Divinyl benzene (crosslinker) 2% v/v → Emulsion or Dispersion Polymerization

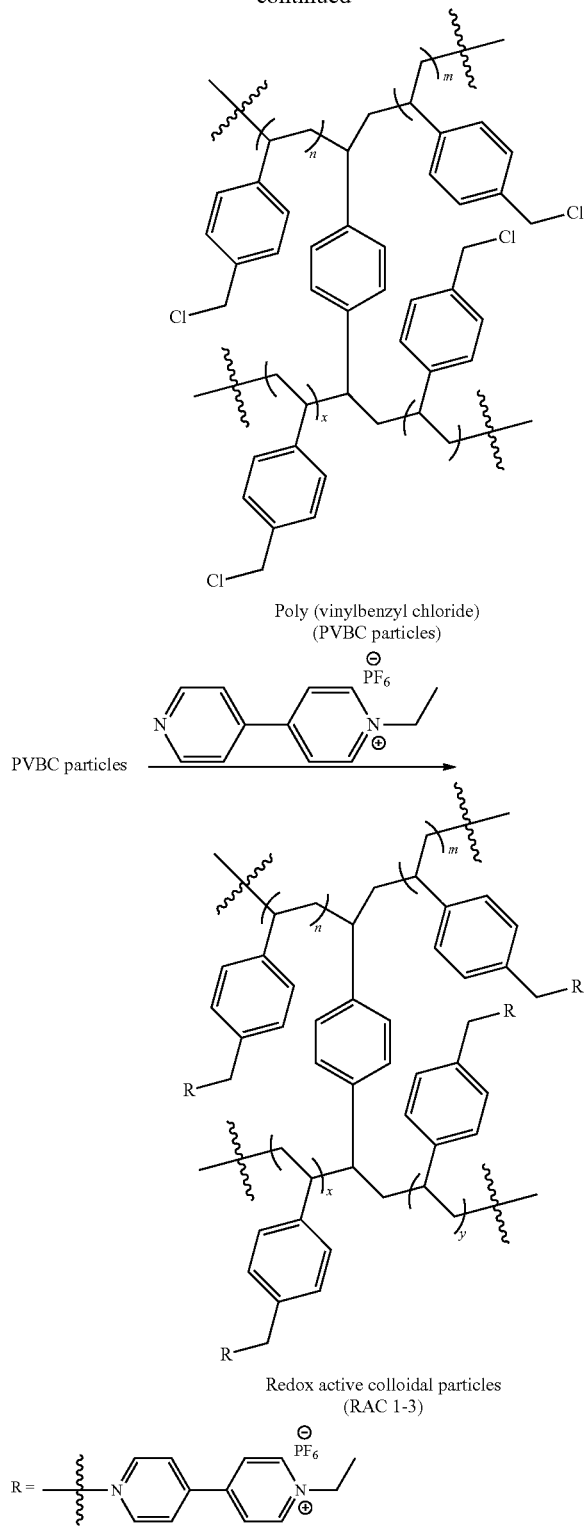

Viologen Redox-Active Colloidal Particles (RACs 1-3) can be prepared as illustrated above. Similar techniques can be used to prepare redox active colloidal particles based on polyacrylate, polymethacrylate, polystyrene, polynorbornene, and polyacrylamide polymer backbones.

Dry DMF (45 mL) and dry THF (45 mL) were added to a flask containing polyvinylbenzyl chloride colloidal particles (1.5 g, 9.83 mmol) and the resultant mixture was sonicated in a bath sonicator until a homogeneous dispersion was obtained (~1-2 h). To the above dispersion ethyl viologen (15 g, 45.4 mmol) was added and reflux condenser was attached. Reflux condenser was sealed with rubber septa at the top. The dispersion was subjected to 3 vacuum/nitrogen cycles followed by purging with nitrogen for about 15 min. The round-bottom flask was then immersed in an oil bath, preheated to 90° C., for 7 days. A concentrated solution of ammonium hexafluoro phosphate (15 g in 30 mL water) solution was prepared and added to the above reaction mixture. To the resultant solution mixture of DMF and acetonitrile (40 mL) was added and stirred at room temperature for 2 days. Water was added to the above solution until a precipitate was observed. The product was separated by centrifuging the mixture. To the obtained product methanol was added, centrifuged (50 mL centrifuge tubes) and the supernatant was decanted. This process was repeated for 3 times with methanol and 2 times with ether. The resultant product was dried under high vacuum for 2 days. RAC 1-3 are peach puff to light salmon color.

Example 3. Preparation of Ferrocene Redox-Active Colloidal Particles

Figure 25:
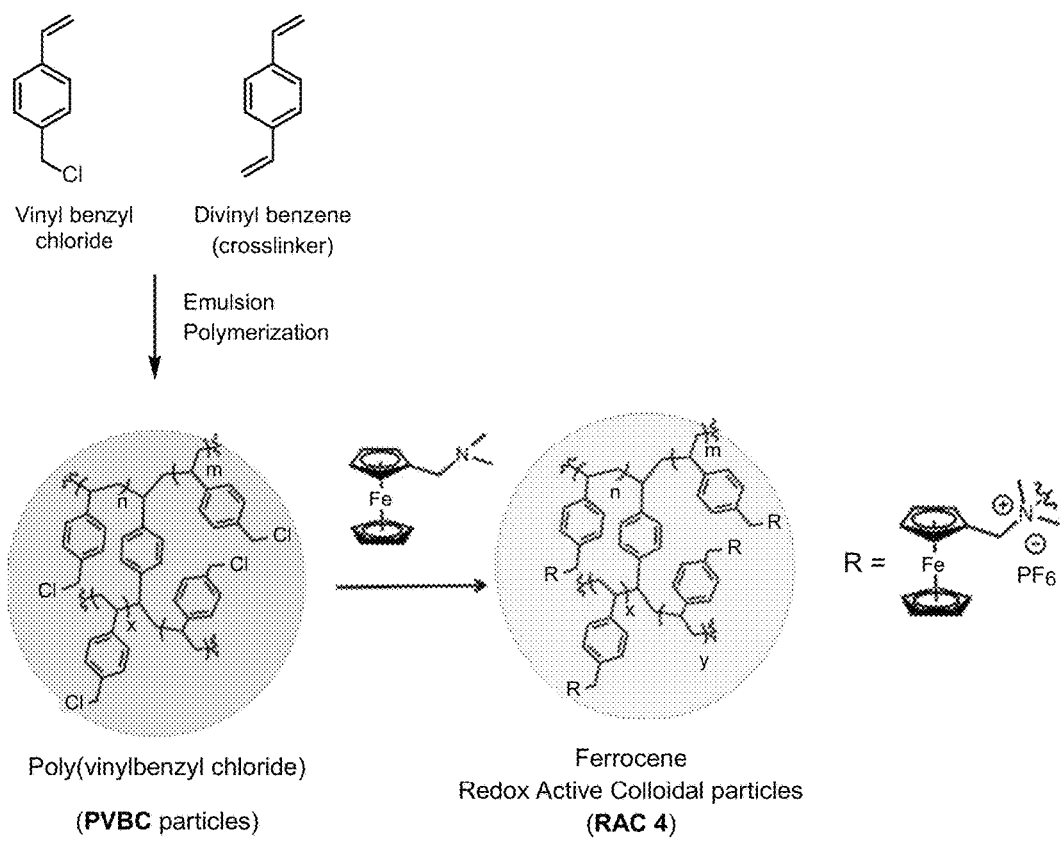
FIG. 25. A scheme showing a preparation of Ferrocene Redox-Active Colloidal Particles.

See FIG. 25.

Ferrocene Redox Active Colloidal Particles (RAC 4):

Dry DMF (50 mL) and dry THF (50 mL) were added to a flask containing crosslinked polyvinylbenzyl chloride colloidal particles (1.0 g) and the resultant mixture was sonicated in bath sonicator until a homogeneous dispersion was obtained (~1-2 h). To the above dispersion (dimethylaminomethyl)ferrocene (12 mL) was added and the flask was sealed with rubber septa. The dispersion was subjected to 3 vacuum/nitrogen cycles followed by purging with nitrogen for about 15 min. The flask was immersed in oil bath preheated to 50° C. and stirred for 4 days. The reaction mixture was precipitated in diethyl ether and colloidal particles were separated by centrifugation. The colloidal particles were redispersed in DMF (~200 mL). A concentrated solution of ammonium hexafluorophosphate (12 g in 30 mL water) was prepared in water and added to the colloidal particle dispersion and stirred for 1 day. The product was collected by precipitating the resultant solution in water. To the obtained product methanol was added, centrifuged (50 mL centrifuge tubes) and the supernatant decanted. This was repeated 3 times with methanol. The product was redispersed in DMF and precipitated in ether. To the obtained product ether was added, centrifuged (50 mL centrifuge tubes) and supernatant decanted. This was repeated 3 times with ether. The resultant colloidal particles were dried under high vacuum for 2 days to obtain RAC 4 as a yellow powder.

Example 4. Electrochemical Characterization of RACs

Electrochemical experiments were performed on a CHI920D or CHI760 potentiostat and inside of an Ar-filled drybox with stringent control of 02 and moisture levels. Chemical reagents, except for synthesized RACs, were purchased from Sigma-Aldrich with the highest available purity. Unless specified, voltammetric and bulk electrolysis experiments were carried out using a standard three-electrode configuration with either a large-area Pt mesh (bulk electrolysis), 12.5 μm radius Pt ultramicroelectrode (UME), or 1 mm radius Pt disk electrode (transient voltammetry) as the working electrode, a non-aqueous Ag/Ag+ reference electrode (CHI112, 0.1 M AgNO$_3$ in acetonitrile solution), and a graphite rod (bulk electrolysis) or Pt wire (transient voltammetry) as counter electrode. Most experiments were carried out in a three-chamber electrochemical cell with 1.0-1.6 µm glass frits. The transient voltammetry of viologen colloids was tested with a 10 mM effective repeating unit concentration for RACs in 0.1 M LiBF$_4$ in acetonitrile as supporting electrolyte.

RAC monolayers for transient voltammetry were prepared by water-air interface methods onto Au substrates fabricated by e-beam evaporation on Si/SiO$_2$ substrates. Prepared monolayer substrates were then used as working electrodes for transient voltammetry. Circular area (3 mm radius) of the substrate was exposed to supporting electrolyte (0.1 M LiBF$_4$) on a home-made substrate holder.

Scanning Electrochemical Microscopy (SECM) measurements were done using 300 nm radius Pt electrode as the working electrode, a Pt wire as counter electrode and a non-aqueous Ag/Ag$^+$ reference electrode. The RACs for SECM experiments were deposited onto a glass substrate. As an example, a nano-dimensioned SECM electrode was used as an electrical contact to a single RAC on an insulating glass surface. The SECM tip was approached to the surface through negative feedback until the tip made contact from crashing. In order to test whether the tip had landed on RAC, cyclic voltammetry was performed to test for the reduction of viologen. If nothing was detected the tip was retracted and reapproached to another location on the surface. The SECM approach curve to RAC gives negative feedback from the electrical inertness of the particle and the substrate. There is a deviation from the negative feedback curve at small values of L (L<2) which is due to collision with the particle and pressing of RAC. The SECM tip has an electrode radius of 300 nm which is approximately half the radius of a single solvated RAC which would manifest as a collision at roughly L=2 in an SECM approach curve. Regarding the evolution of the cathodic step chronoamperograms, we ascribe the difference in charge observed with respect to the anodic step to small traces of O$_2$ reduction in our cell which accumulate charge over time. However, it is also possible that some of the differences between the first and consecutive cycles could be due to a RAC "pre-conditioning step," i.e., changes in swelling of the polymer structure following charge injection in the RAC.

RAC 3 containing substrates were prepared for use in SECM. The RAC 3 samples for single nanoparticle SECM were made by drop-dry method. 0.1 mg/mL RAC 3 acetonitrile solution was made and sonicated 5 minutes before use. 5 µL of solution were directly dropped onto a glass slide and let dry in air. The result was a dispersed RAC 3 array with distances between particles larger than 2 µm.

Charge storage properties of RAC dispersions were studied by potential-controlled bulk electrolysis (BE). A Pt mesh or carbon felt working electrode were held at a constant overpotential while stirring. Current and charge response over time was recorded. For reduction, the potential was held −150 mV from $E_{1/2}$ and +200-300 mV from $E_{1/2}$ for oxidation. UME voltammograms using 12.5 µm radius Pt UMEs were obtained before and after BE to track steady state limiting currents, confirming complete transformation. A three-compartment cell was used, with the working electrode in the center compartment, and the two lateral compartments occupied by a graphite rod as a counter electrode, and a non-aqueous Ag/Ag$^+$ reference electrode. The chemical stability of the charged state for RACs 1-3 was studied by reducing the RACs to the charged state (V$^+$) via BE and monitoring their absorption spectra over a one week period.

A flow cell made with stainless steel flow fields was used for the NRFB prototype. Porous carbon electrodes (SGL GFA6) were inserted into flow fields as electrode material (4.63 cm$^2$ active area). Flow fields were separated by Teflon gaskets holding nanoporous separator Celgard 2325. Dispersion was flowed at 5 mL/min on a MasterFlex L/S Digital.

Example 5. Preparation of Monolayer Films from Each of RAC 1, RAC 2, and RAC 3

Solutions of RACs 1-3 in acetonitrile (3 mg/mL) were prepared and dispersed by sonication for 15 minutes before use as a stock solution. Relatively smooth Au substrates were fabricated via E-beam evaporation with 5 nm Ti adhesion layer and 50 nm Au on Si wafer at a slow evaporation rate of 0.1-0.2 Å/s. A water-air interface method was applied to fabricate monolayer films of 80 nm and 135 nm VioRACs. A glass trough (22 mm diameter) was cleaned with Nochromix and blow-dried with Ar. 40 µL of stock solution was slowly injected along glass side wall and spread on the surface of deionized water. A microscope slide was used to cover the trough and let film equilibrate overnight. The self-assembled RACs film floated onto the deionized water surface. Langmuir-Schaefer method was applied to transfer monolayer film to Au substrate. The water-air interface method did not successfully translate to the larger RAC 3 because it consistently formed a low density film. Langmuir-Blodgett (LB) Film Trough (NIMA 311D) was used to apply constant pressure to condense RAC 3 film. A 1 mL stock solution was slowly spread on the surface of deionized water inside compressing barrier. By slowly approaching the barrier of LB trough and holding constant pressure at 55 mN/m, the RAC 3 monolayer film was formed on water surface. Langmuir-Schaefer methods were applied to transfer monolayer film to Au substrate.

Example 6. Crossover Studies of LiBF$_4$, Monomer (Benzyl Ethyl Viologen), and RACs 1-3 Across Separators of Different Pore Sizes PermGear Side-Bi-Side cell was used to study the crossover properties of LiBF$_4$, monomer and RACs across Celgard 2325 (pore size 28 nm), and Celgard 2400 (pore size 43 nm). Celgard separator was sandwiched between the donor and receiver compartments of the Side-Bi-Side cell. A solution of LiBF$_4$, monomer or RACs (0.01M) in acetonitrile was taken in the donor compartment. Receiver compartment was filled with acetonitrile. Solution was stirred at 1200 rpm using magnetic stir bar for 24 h. UV-Vis absorbance of the solution in the receiver compartment was recorded to determine the concentration of the sample. Conductivity of the solution was measured to determine the concentration of LiBF$_4$ sample. Ethyl viologen hexafluoro phosphate, benzyl-ethyl viologen dihexafluorophosphate and polyvinylbenzyl chloride particles were synthesized following the reported protocols.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A redox flow battery comprising a first and a second chamber separated by a microporous or nanoporous size-exclusion membrane, wherein the first and second chambers each contain a non-aqueous solvent, a charge balancing ion, and an electrode; and wherein the first chamber contains one or more colloidal particles suspended in the non-aqueous solvent, wherein the colloidal particles are redox-active viologen-based polymer particles, and wherein at least one of colloidal particles comprises a first polymer chain crosslinked with a second polymer chain.

2. The flow battery of claim 1 wherein the battery further comprises particles that are redox-active ferrocene-based polymer particles.

3. The flow battery of claim 1 wherein the first polymer chain and the second polymer chain comprise the same type of monomer.

4. The flow battery of claim 1 wherein at least one of the colloidal particles comprises a third polymer chain crosslinked with the first polymer chain, the second polymer chain, or both, and wherein the first polymer chain, the second polymer chain, and the third polymer chain comprise the same type of monomer.

5. The flow battery of claim 1 wherein at least one of the colloidal particles comprises a redox-active viologen-based polymer particle comprising Formula I:

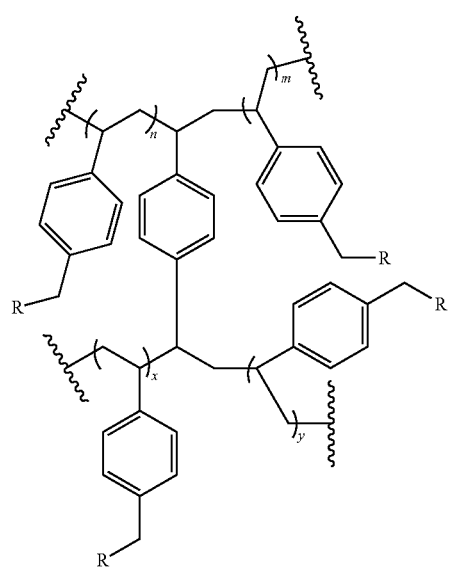

(I)

wherein
R is

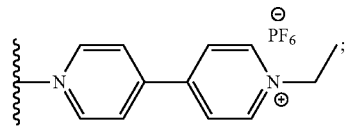

and m, n, x, and y are each independently positive integers that provides sufficient cross-linking within the particle such that particle has a diameter of about 10 nm to about 800 nm.

6. The flow battery of claim 2 wherein at least one of the colloidal particles comprises a redox-active ferrocene-based polymer particle comprising Formula I:

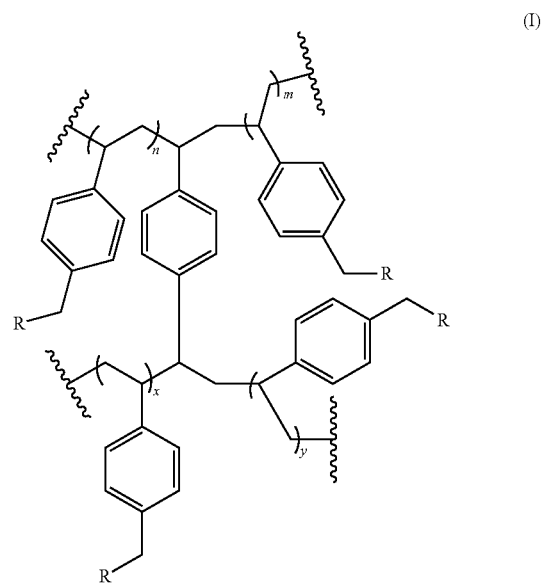

(I)

wherein
R is

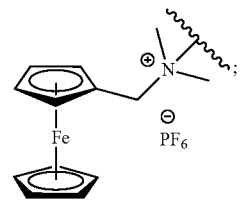

and m, n, x, and y are each independently positive integers that provides sufficient cross-linking within the particle such that particle has a diameter of about 10 nm to about 100 μm.

7. The flow battery of claim 1 wherein the charge balancing ion comprises $Li^+$, $Na^+$, $K^+$, $Mg^{+2}$, $Ca^{+2}$, or $NH_4^+$, or $N(R_A)_4^+$ wherein each $R_A$ is independently H, alkyl, aryl, or pyridinium.

8. The flow battery of claim 1 wherein the first and second chambers contain an electrolyte solution comprising anions selected from $BF_4^-$, $PF_6^-$, $ClO_4^-$, $AsF_6^-$, $CF_3SO_3^-$, $N(SO_2CF_3)_2^-$, $N(SO_2CF_2CF_3)_2^-$, $B(C_2O_4)^{2-}$, $B_{12}X_nH_{(12-n)}^{2-}$, and $X^-$, wherein X is a halogen and n is a non-negative integer less than or equal to 12.

9. The flow battery of claim 1 wherein the non-aqueous solvent is acetonitrile, ethylene carbonate, propylene carbonate, butylene carbonate, dimethyl carbonate, diethyl carbonate, dipropyl carbonate, ethyl methyl carbonate, fluoroethylene carbonate, gamma-butyrolactone, N-methyl-2-pyrrolidone, N,N-dimethylformamide, N,N-dimethylacetamide, dimethylsulfoxide, dichloromethane, chloroform, benzene, toluene, xylene, chlorobenzene, nitrobenzene, methyl acetate, ethyl acetate, acetone, methyl ethyl ketone, cyclohexanone, diethyl ether, 1,2-dimethoxyethane, tetraethylene glycol dimethyl ether, bis(2-methoxyethyl) ether, tetrahydrofuran, 1,4-dioxane, methanol, ethanol, or a combination thereof.

10. A redox flow battery comprising a first and a second chamber separated by a microporous or nanoporous size-exclusion membrane, wherein the first and second chambers each contain a non-aqueous solvent, a charge balancing ion, and an electrode;

wherein the first chamber contains one or more colloidal particles suspended in the non-aqueous solvent, wherein the colloidal particles are redox-active viologen-based polymer particles, redox-active ferrocene-based polymer particles, or a combination thereof; and wherein at least one of the colloidal particles comprises a redox-active viologen-based polymer particle comprising Formula I:

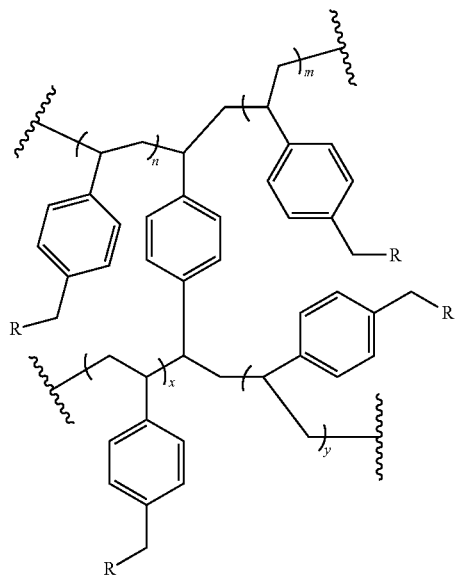

(I)

wherein
R is

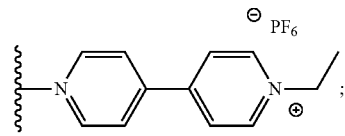

and
m, n, x, and y are each independently positive integers that provides sufficient cross-linking within the particle such that particle has a diameter of about 10 nm to about 100 μm.

11. The flow battery of claim 10 wherein the particle has a diameter of about 10 nm to about 800 nm.

12. The flow battery of claim 10 wherein the particle has a diameter of about 20 nm to about 90 nm.

13. The flow battery of claim 10 wherein the particle has a diameter of about 20 nm to about 750 nm.

* * * * *